(12) United States Patent
Miskell et al.

(10) Patent No.: US 8,794,063 B2
(45) Date of Patent: Aug. 5, 2014

(54) SYSTEM AND METHOD FOR OPTIMIZING SWEEP DELAY AND ALIASING FOR TIME DOMAIN REFLECTOMETRIC MEASUREMENT OF LIQUID HEIGHT WITHIN A TANK

(75) Inventors: Thomas J. Miskell, Merrimack, NH (US); Zhenyu Tan, Nashua, NH (US); Kevin J. Petriel, Weare, NH (US); Carlos E. Carvalho, Tyngsborough, MA (US); Ronie Lavon, Derry, NH (US)

(73) Assignee: Meggitt (Orange County), Inc., Irvine, CA (US)

( * ) Notice: Subject to any disclaimer, the term of this patent is extended or adjusted under 35 U.S.C. 154(b) by 774 days.

(21) Appl. No.: 12/630,305

(22) Filed: Dec. 3, 2009

(65) Prior Publication Data
US 2010/0153029 A1    Jun. 17, 2010

Related U.S. Application Data

(63) Continuation-in-part of application No. 12/243,511, filed on Oct. 1, 2008, which is a continuation-in-part of application No. 11/650,841, filed on Jan. 8, 2007, now Pat. No. 7,650,785.

(51) Int. Cl.
*G01F 23/00* (2006.01)

(52) U.S. Cl.
USPC ........................................................ 73/290 V

(58) Field of Classification Search
CPC .... G01F 23/28; G01F 23/284; G01F 23/2845
USPC ........................................................ 73/290 V
See application file for complete search history.

(56) References Cited

U.S. PATENT DOCUMENTS

| | | |
|---|---|---|
| 3,246,180 A | 4/1966 | Keeney, Jr. |
| 3,474,337 A | 10/1969 | Petrick |

(Continued)

FOREIGN PATENT DOCUMENTS

| | | |
|---|---|---|
| DE | 102004032965 A1 | 2/2006 |
| EP | 0042186 A1 | 12/1981 |

(Continued)

OTHER PUBLICATIONS

A. Cataldo, A. Lay-Ekuakille, C. Decarlo, Remote Sensing of Liquid Characteristics Using Time Domain Reflectometry, Earth Observing Systems VII, Proceedings of SPIE vol. 4814 (2002) p. 465-473, AGM Industrie S.p.A., Martignnano Lecce, Italy.

(Continued)

*Primary Examiner* — Hezron E Williams
*Assistant Examiner* — Nathaniel Kolb
(74) *Attorney, Agent, or Firm* — Peter A. Nieves; Sheehan Phinney Bass + Green PA

(57) ABSTRACT

A layer height measuring system in one embodiment has a transmission line including a probe for measuring a height of a first layer within a tank and a cable that connects the probe to an electronics unit. The electronics unit cyclically transmits interrogation pulses to the probe and receives reflections therefrom for time domain reflectometric measurement of the height of the first layer. The layer height measuring system may also have a memory and a processor configured by the memory to perform the steps of detecting first and second impedance transitions corresponding to first and second boundaries of a bounded region of known length; optimizing a sweep offset and a sweep gain so as to cause swept sample collection to occur substantially only within the bounded region; and detecting a third impedance transition within the bounded region, the third impedance transition corresponding to an interface between the first layer and a second layer, the first and second layers having respectively different dielectric constants.

18 Claims, 9 Drawing Sheets

(56) References Cited

U.S. PATENT DOCUMENTS

| | | | |
|---|---|---|---|
| 4,161,704 A | 7/1979 | Schafer | |
| 4,596,144 A | 6/1986 | Panton et al. | |
| 4,786,857 A | 11/1988 | Mohr et al. | |
| 4,881,912 A | 11/1989 | Thommen et al. | |
| 5,457,990 A | 10/1995 | Oswald et al. | |
| 5,610,611 A | 3/1997 | McEwan | |
| 5,734,346 A | 3/1998 | Richardson et al. | |
| 5,827,985 A | 10/1998 | Grieger et al. | |
| 5,841,666 A | 11/1998 | Perdue et al. | |
| 5,943,908 A | 8/1999 | Innes et al. | |
| 5,973,637 A | 10/1999 | Perdue et al. | |
| 5,979,233 A | 11/1999 | Johnson | |
| 6,078,280 A * | 6/2000 | Perdue et al. | 342/124 |
| 6,138,508 A | 10/2000 | Hannan et al. | |
| 6,229,476 B1 | 5/2001 | Lutke et al. | |
| 6,232,910 B1 | 5/2001 | Bell et al. | |
| 6,281,801 B1 | 8/2001 | Cherry et al. | |
| 6,285,538 B1 | 9/2001 | Krahn | |
| 6,297,969 B1 | 10/2001 | Mottahed | |
| 6,504,793 B2 | 1/2003 | Fuenfgeld | |
| 6,556,511 B1 | 4/2003 | Welke | |
| 6,558,172 B2 | 5/2003 | Kanagawa | |
| 6,559,657 B1 | 5/2003 | McCarthy et al. | |
| 6,626,038 B1 * | 9/2003 | Carsella et al. | 73/290 R |
| 6,640,629 B2 | 11/2003 | Carsella et al. | |
| 6,644,114 B1 | 11/2003 | McEwan | |
| 6,650,280 B2 | 11/2003 | Arndt et al. | |
| 6,690,320 B2 | 2/2004 | Benway et al. | |
| 6,701,783 B2 | 3/2004 | Fehrenbach et al. | |
| 6,906,662 B2 | 6/2005 | Faust et al. | |
| 7,012,437 B2 | 3/2006 | Klofer | |
| 7,068,051 B2 | 6/2006 | Anderson | |
| 7,073,379 B2 | 7/2006 | Schroth et al. | |
| 7,162,922 B2 | 1/2007 | Freger et al. | |
| 7,165,450 B2 | 1/2007 | Jamnia et al. | |
| 7,237,435 B2 | 7/2007 | Motzer et al. | |
| 7,243,539 B2 | 7/2007 | Otto et al. | |
| 7,255,002 B2 | 8/2007 | Gravel et al. | |
| 7,392,699 B2 | 7/2008 | Motzer et al. | |
| 7,446,695 B2 | 11/2008 | McEwan | |
| 7,525,476 B1 | 4/2009 | Delin et al. | |
| 7,571,645 B2 | 8/2009 | Bostrom | |
| 7,918,133 B2 | 4/2011 | Volpe et al. | |
| 2001/0035048 A1 | 11/2001 | Gualtieri | |
| 2002/0053239 A1 * | 5/2002 | Fehrenbach et al. | 73/290 V |
| 2002/0084931 A1 | 7/2002 | Bletz | |
| 2002/0101373 A1 | 8/2002 | Arndt et al. | |
| 2002/0155755 A1 | 10/2002 | Yamane | |
| 2004/0007061 A1 | 1/2004 | Forgue | |
| 2004/0027137 A1 | 2/2004 | Sherrard | |
| 2004/0182149 A1 | 9/2004 | Balin et al. | |
| 2004/0183550 A1 | 9/2004 | Fehrenbach et al. | |
| 2005/0127924 A1 | 6/2005 | Motzer et al. | |
| 2005/0192727 A1 | 9/2005 | Shostak et al. | |
| 2007/0081617 A1 | 4/2007 | Fudge | |
| 2007/0204689 A1 | 9/2007 | Bostrom | |
| 2008/0034863 A1 | 2/2008 | Bartoli et al. | |
| 2008/0105048 A1 | 5/2008 | Nilsson et al. | |
| 2009/0076744 A1 | 3/2009 | Anderson | |
| 2009/0158839 A1 * | 6/2009 | Spanke et al. | 73/290 V |
| 2009/0178478 A1 | 7/2009 | Reimelt et al. | |
| 2009/0186522 A1 | 7/2009 | Henningsen | |
| 2009/0235737 A1 | 9/2009 | Lavon | |
| 2009/0249870 A1 | 10/2009 | Volpe et al. | |
| 2009/0282911 A1 | 11/2009 | Bostrom | |
| 2010/0000316 A1 | 1/2010 | Fehrenbach et al. | |
| 2010/0070208 A1 | 3/2010 | Sai | |
| 2010/0153029 A1 | 6/2010 | Miskell et al. | |
| 2011/0209543 A1 | 9/2011 | Miskell et al. | |
| 2011/0241698 A1 | 10/2011 | Carvalho et al. | |

FOREIGN PATENT DOCUMENTS

| | | | |
|---|---|---|---|
| EP | 0473082 A | 3/1992 | |
| EP | 2012098 A1 | 1/2009 | |
| EP | 2198252 A1 | 6/2010 | |
| GB | 2466162 A | 6/2010 | |
| JP | H10511181 A | 10/1998 | |
| JP | 11248518 | 9/1999 | |
| JP | 2004045380 | 2/2004 | |
| RU | 2249796 C1 | 4/2005 | |
| RU | 2289795 C1 | 12/2006 | |
| WO | WO9619715 | 6/1996 | |
| WO | WO9926080 A | 5/1999 | |
| WO | WO 01/63219 A2 | 8/2001 | |
| WO | WO 02/25277 | * | 3/2002 |
| WO | WO 02/25277 A1 | 3/2002 | |
| WO | WO2009046103 A | 4/2009 | |

OTHER PUBLICATIONS

Azevedo, Stephen and McEwan, Thomas; Micropower Impulse Radar; Science & Technology Review Jan./Feb. 1996, pp. 17-29.

* cited by examiner

SYSTEM AND METHOD FOR OPTIMIZING SWEEP DELAY AND ALIASING FOR TIME DOMAIN REFLECTOMETRIC MEASUREMENT OF LIQUID HEIGHT WITHIN A TANK

CROSS-REFERENCE TO RELATED APPLICATIONS

This application is a continuation-in-part of, and claims priority to, copending U.S. nonprovisional patent application entitled "System and Method for Accurately Measuring Fluid Level in a Tank," having Ser. No. 12/243,511, filed Oct. 1, 2008, and copending U.S. nonprovisional patent application entitled "Scan Lock and Track Fluid Characterization and Level Sensor Apparatus and Method," having Ser. No. 11/650,841, filed Aug. 1, 2007, both of which are hereby incorporated herein by reference in their entireties.

FIELD OF THE INVENTION

The present invention is generally related to time domain reflectometric detection of layers of substances of dissimilar dielectric constant, and more particularly is related to a system and method for dielectric-constant-insensitive determination of the height of a liquid layer within a tank.

BACKGROUND OF THE INVENTION

A common problem in many different fields is the need to know the height of a liquid within a tank. For example, where an air space is formed above the surface of liquid fuel present in the fuel tank of an automobile or airplane, knowledge of the shape of the tank and the height of the air-liquid interface from the tank bottom will allow one to calculate the amount of remaining fuel.

Where a plurality of stratifying liquids are present within a tank, it may furthermore be desired to know the height of each stratified liquid layer. For example, where water is mixed with hydrocarbon fuel intentionally, such as when seawater is used as ballast in oil tankers; or unintentionally, such as when water is present in a vehicle fuel tank or such as when groundwater seeps into tanks for fuel pumps at filling stations, it may be desired to know the height of fuel layer(s) as distinct from nonfuel layer(s) for accurate determination of remaining fuel.

Time domain reflectometry (TDR) applies radar techniques to transmission line theory to detect the location of impedance transitions or discontinuities at interfaces between different layers of materials. In TDR, an interrogation pulse transmitted from a transmitter is reflected from such an impedance discontinuity, and the reflected pulse is received by a receiver, the distance (range) to the impedance discontinuity that caused the reflection being calculatable from the observed round-trip propagation time.

However, there are number of technical problems that have limited the usefulness of TDR to measurement of liquid height within a tank. In particular, such technical problems have prevented accurate and reliable detection of interfaces between layers of comparatively similar dielectric constant, such as air and hydrocarbon fuel, or between layers of stratified immiscible liquids.

One such technical problem is the effect of relative permittivity (also referred to herein as "dielectric constant," sometimes abbreviated as "dielectric") on velocity of propagation. That is, the velocity of propagation of the interrogation pulse as it travels from the transmitter to the impedance discontinuity and back to the receiver will vary depending on the dielectric constant(s) of the medium or media through which the pulse is traveling in accordance with the relationship $$v = \frac{c}{\sqrt{\varepsilon}},$$

where v=velocity of propagation, c=speed of light, and $\varepsilon$=dielectric constant. Since dielectric constant varies depending on material, and since dielectric constant of many materials can be a strong function of density (and thus of temperature), and is often moreover a strong function of the amount of any additive or contaminant that may be present, the velocity of propagation of the traveling pulse is in general changing as it goes from one material to another, and the velocity of propagation in any given medium may moreover vary in correspondence to such things as additive content and temperature. The effect of temperature on dielectric constant is especially true of liquids, and the effect of additive content on dielectric constant is especially true of ethanol additive in hydrocarbon fuel.

Another such technical problem is the practical difficulty, using commercially available electronics, of measuring the impedance changes that occur along the length of the TDR probe to a spatial resolution that will provide an acceptable rendering of the height profile of the various layers in which the TDR probe is immersed within the tank. Resolving such impedance changes to a degree sufficient to accurately determine layer height will be especially difficult for interfaces between layers of comparatively similar dielectric constant. That is, whereas it may have conventionally been possible to resolve interfaces between layers of comparatively dissimilar dielectric constant, such as air and water, it has conventionally been difficult to accurately resolve interfaces between layers of comparatively similar dielectric constant, such as air and hydrocarbon fuel, or between layers of stratified immiscible liquids.

An order-of-magnitude analysis of typical distances and times involved will show that, for transmission line distances on the order of several meters, for example, the round-trip pulse propagation time might be on the order of several tens of nanoseconds, and spatially resolving the impedance changes along a probe of length on the order of several decimeters to an accuracy on the order of 1 millimeter would require ability to sample the reflected pulse at successive time increments on the order of 1 picosecond apart. Thus, although it might be possible to capture, in analog fashion after the fashion of an oscilloscope trace, the reflected waveform from a single interrogation pulse and observe such picosecond-order impedance variations, it would be impractical to design digital circuitry capable of capturing and processing samples spaced apart at such small time increments over the course of a single interrogation pulse cycle.

Instead, to achieve such sampling resolutions with affordable digital electronics, an aliasing sampling system may be employed as disclosed in commonly assigned U.S. nonprovisional patent application Ser. No. 12/243,511 entitled "System and Method for Accurately Measuring Fluid Level in a Tank." In such an aliasing sampling system, the interrogation pulse is transmitted in cyclical fashion at a frequency on the order of 1 MHz, for example, and a swept phase shift or delay is introduced between the time that the interrogation pulse is transmitted and the time that a sample is captured. In this way, with times on the order of one microsecond between successive 1 MHz pulses, the electronics have a chance to recover between samples, and the desired resolution can be achieved by sweeping, or incrementally increasing with each successive cycle, the delay (phase shift) between pulse transmission and sample capture. The train of samples captured at times corresponding to the swept increase in phase shift can be said to exhibit aliasing, since the net effect of combining the constant interrogation pulse frequency with the swept sampling frequency is to produce a microsecond-order version of the picosecond-order waveform, the progressively delayed sampling occurring due to the swept phase shift appearing as a "beat frequency" that is slow enough to be captured and processed by the electronics.

However, even with such techniques, the limitations of economically available electronics still make it impractical conventionally to spatially resolve the height profile of the various layers in which the TDR probe is immersed. Continuing with the example given above, to achieve a spatial resolution on the order of 1 millimeter with a transmission line of length on the order of several meters would require on the order of several thousand samples. These several thousand samples might be collected over the course of several milliseconds if 1 sample were collected at every 1 MHz pulse and each such sample was usable by the digital signal processing electronics. However, to achieve an acceptable signal-to-noise ratio, it is found in practice that many raw samples must be averaged together by fast analog filtering electronics to create a single filtered sample that is then collected by the slower digital signal processing electronics. That is, sampling is actually occurring at two levels: raw samples are averaged together by filtering, and the filtered samples are then being collected by the digital electronics. Allowing time for filtering to be carried out between the samples collected by the digital electronics results in times on the order of 500 microseconds between successive filtered samples. This being the case, at 500 microseconds per sample, several thousand samples would take on the order of several seconds to collect. Such slow response times are unacceptable for many applications.

Furthermore, this problem of slow response time and inefficient use of processing capacity is made even worse in situations where there are significant lengths of cable or other such transmission line medium between digital signal processing electronics and TDR probe(s). This may be the case where the digital signal processing electronics are removed by some distance from the probe for safety or for convenience, or so that a single digital signal processing electronics unit can be used with multiple probes located various distances therefrom.

For this and other reasons, conventional commercial TDR systems have generally been unable to adequately resolve the impedance changes occurring along the length of the TDR probe with a spatial resolution and response time sufficient to obtain a reasonably accurate rendering of the height profile of the various layers in which the TDR probe is immersed within the tank. Several practical TDR systems have therefore been proposed to overcome these difficulties, but conventional TDR systems for measuring liquid level within a tank still suffer from problems such as inadequate resolution, slow response time, and sensitivity to variation in dielectric constant and/or temperature.

For example, as disclosed in commonly assigned U.S. non-provisional patent application Ser. No. 12/243,511 entitled "System and Method for Accurately Measuring Fluid Level in a Tank," a time-of-flight-based technique has been proposed where it has not been possible to reliably detect an air-liquid interface or liquid-liquid interface at the top or bottom of a liquid layer is to determine liquid layer height based not on locations of such interfaces but on the amount by which propagation of the interrogation pulse and its reflection from an easily detectable impedance transition (such as the bottom of an electrically open- or short-circuited TDR probe) is delayed as a result of passage through that liquid layer. However, because the pulse reflected from the probe bottom (which is typically in the vicinity of the tank bottom) must necessarily pass through the liquid layer being measured, such measurements based on the time of flight of the pulse reflected from the probe bottom are susceptible to variations in the temperature and dielectric constant of that liquid layer.

In one variation proposed in commonly assigned U.S. non-provisional patent application Ser. No. 11/650,841 entitled "Scan Lock and Track Fluid Characterization and Level Sensor Apparatus and Method," a closed-loop scan-lock-track methodology is employed to find and lock onto a surface of interest. Once the surface of interest has been found, samples need not thereafter be taken along the entire transmission line but may instead be taken only in the vicinity of this surface of interest. Targeting the region around the surface of interest in this way permits more efficient use of processing capacity, allowing better spatial resolution to be obtained from a smaller number of samples.

For example, such a surface of interest that could be locked onto and tracked using such scan-lock-track methodology is the air-liquid interface which moves to successively lower heights above the bottom of a fuel tank as fuel within the tank is consumed. In practice, however, it is found that the comparatively weak reflection from the air-liquid interface is not as easy to detect as the strong signal corresponding to the reflection from the probe bottom. Furthermore, liquid-liquid interfaces may be even more difficult to detect than the air-liquid interface. In practice, therefore, where scan-lock-track methodology is used to lock onto and track the reflection from the probe bottom, the perceived location of the probe bottom on an impedance-versus-time trace will depend on the propagation time of the pulse as it travels through liquid layer(s). Conventional scan-lock-track measurements of liquid height calculated based on the arrival time of the pulse reflected from the probe bottom are therefore still susceptible to the effects of temperature and dielectric constant on that propagation time.

Such dependence on temperature and dielectric constant is undesirable in situations where temperature or dielectric constant is unknown (the latter often being the case, for example, when additive, contaminant, or stratified liquids are present), and is particularly unsuited to aircraft fuel gauge applications and other situations where one is generally more interested in knowing mass rather than volume of remaining fuel.

It would therefore be desirable to employ a TDR system that, rather than locking onto and tracking the region in the vicinity of the air-liquid interface and measuring liquid height in a way that is dependent on liquid temperature and/or dielectric constant, instead locks onto and tracks the region corresponding to the entire probe and renders the impedance profile of the various layers in which the TDR probe is immersed with a spatial resolution allowing liquid height to be measured in a way that is comparatively insensitive to changes in liquid temperature and dielectric constant.

For example, it would be desirable to employ a TDR system in which sample collection does not begin simultaneous with transmission of the interrogation pulse but only after first waiting for a time which might be referred to as an offset time. It would furthermore be desirable if this offset time between the time that the interrogation pulse is transmitted and the time that swept sample collection begins (sweep offset) were set so as to cause sample collection to start at or slightly prior to a time when an interrogation pulse edge reflected from the top of the probe would have just arrived at the receiver.

Similarly, once sample collection has started, it would be desirable if the size of the increment in the delay between successive swept samples (sweep gain) were set so that, given a reasonable number of samples that can be collected and processed with satisfactory response time, the last of the samples is collected at or slightly after a time when an interrogation pulse edge reflected from the bottom of the probe would have just arrived at the receiver. Doing so would allow sweep offset and gain to be optimized so as to permit maximum resolution of the impedance variations occurring along the length of the probe in correspondence to the available sample processing capacity of the electronics.

However, even if such optimization were to be carried out as described above so that a reasonable number of samples capable of being collected and processed with satisfactory response time were collected at times between the approximate time when an interrogation pulse edge reflected from the top of the probe would have just arrived at the receiver and the approximate time when an interrogation pulse edge reflected from the bottom of the probe would have just arrived at the receiver, there is still the problem of variability in the parameters affecting those reflected pulse arrival times.

For example, even where only a single probe is employed, reflected pulse arrival time will vary depending on such parameters as cable length, probe length, and tank content. In particular, while probe top reflected pulse arrival time might be expected to be relatively constant for a particular cable-probe system, probe bottom reflected pulse arrival time can vary widely depending on tank content due to the effect of dielectric constant on velocity of propagation as noted above. For example, since the dielectric constant of air is lower than that of most liquids, the probe bottom reflected pulse arrival time will typically be later for a tank full of liquid fuel than for an empty tank. Similarly, where variable amounts of water and hydrocarbon fuel are present within a tank, the high dielectric constant of water relative to either hydrocarbon fuel or air can be expected to cause the probe bottom reflected pulse to arrive at the receiver much later when water is present than when water is absent.

Furthermore, in systems where multiple transmission lines contain multiple cables connected to multiple probes in multiple tanks of varying size and content, and these multiple transmission lines are coupled to the same electronics unit, in multiplexed or time-shared fashion for example, the different lengths and characteristics of the respective cables, the different lengths and characteristics of the respective probes, and the different contents of the respective tanks would, without some special adapter or other stratagem, cause probe top reflected pulse arrival time and probe bottom reflected pulse arrival time to vary in accordance with the different cable-probe-tank systems. Furthermore, especially when for reason of convenience or safety there are significant lengths of cable between digital signal processing electronics and probe(s), collection of samples at locations (times) not corresponding to a probe will result in poor response time and/or poor resolution. It would therefore be desirable to be able to conveniently match such electronics to a wide variety of cable-probe-tank systems by varying sweep delay and aliasing in correspondence to cable and probe characteristics as well as tank content. This would make it possible to conveniently adapt the electronics to each cable-probe-tank system, or adapt each cable-probe-tank system to the electronics, so that the train of collected samples covers the range from the approximate probe top to the approximate probe bottom regardless of cable length and other characteristics, regardless of probe length and other characteristics, and regardless of tank content. It would moreover be desirable if this matching of electronics and cable-probe-tank systems could be carried out automatically to seamlessly permit the same or similar electronics to be used with multiple cable-probe-tank systems.

Moreover, even if sweep delay and aliasing were to be optimized for a particular cable-probe-tank system so as to permit maximum resolution of the impedance variations occurring along the length of the probe in correspondence to the available sample processing capacity of the electronics as described above, a technical problem that would remain is the question of what algorithm will permit most accurate determination of the height profile of the various layers in which the TDR probe is immersed within the tank.

It would therefore be desirable to employ an algorithm that would allow such a (space domain) height profile to be accurately derived from the (time domain) impedance-versus-time trace obtained by TDR.

It would furthermore be desirable to employ an algorithm that would allow this height profile to be accurately derived from the impedance-versus-time trace in a way that corrects for the different dielectric constants that the different layers in which the probe is immersed may have.

It would moreover be desirable to employ an algorithm that would allow this height profile to be accurately derived from the impedance-versus-time trace in a way that is insensitive to the dielectric constant of at least one of the layers in which the probe is immersed. That is, it would be desirable to be able to obtain such a height profile even when the dielectric constant of at least one of the layers in which the probe is immersed in unknown. The dielectric constant of such a layer may be unknown because, for example, the chemical composition of the layer is unknown (because of unknown amount of ethanol or other such additive, or water or other such contaminant), or because temperature (and thus density) of that layer is unknown.

That is, even where it is possible to determine dielectric constants of one or more layers based on impedance values for layers derivable from impedance-versus-time traces (impedance axis of TDR trace) and/or based on times of flight through layers derivable from impedance-versus-time traces (time axis of TDR trace), it may be desirable to have an algorithm for calculating layer height that is insensitive to the dielectric constant and/or temperature of at least one layer.

Conversely, even where it is possible to determine layer height in a way that is insensitive to the dielectric constant and/or temperature of at least one layer, it may be desirable to have an algorithm that would permit measurement of dielectric constant of at least one layer. Such an algorithm might be used alone or in conjunction with any of the algorithms referred to above. For example, ability to measure dielectric constant of at least one layer might be desirable because it would make it possible to more accurately convert the time domain profile obtained by TDR to a space domain layer height profile through use of the relationship $$d \propto \frac{t}{\sqrt{\varepsilon}}$$

where d=distance, t=time, and $\varepsilon$=dielectric constant. As another example, ability to measure dielectric constant of at least one layer might be desirable because it would make it possible to calculate the temperature (and thus density and/or volume) thereof. As yet another example, ability to measure dielectric constant of at least one layer might be desirable because it would make it possible to determine the chemical composition thereof, and thus make it possible to identify such things as contamination, degradation in quality, misfueling (that is, when the tank has inadvertently been filled with the wrong fuel), and/or other phenomena related to chemical composition that manifest as changes in dielectric constant.

Moreover, as alluded to above, the reflection of the interrogation pulse from the bottom of the electrically open- or short-circuited TDR probe has large amplitude. This being the case, the large-amplitude pulse reflected from the probe bottom may swamp or overwhelm pulses reflected from air-liquid or liquid-liquid interfaces, making detection of those interfaces difficult, when those interfaces are close to the probe bottom (which is typically in the vicinity of the tank bottom). For example, a tank that is almost empty or contains only a small amount of fuel will typically have an air-liquid interface that is near the tank bottom. It would therefore be desirable to employ an alternate algorithm that does not depend on detection of reflections from air-liquid or liquid-liquid interfaces when those interfaces are close to the probe bottom.

Thus, a heretofore unaddressed need exists in the industry to address the aforementioned deficiencies and inadequacies.

SUMMARY OF THE INVENTION

Embodiments of the present invention provide a system and method for accurately measuring the height of a liquid layer within a tank. Briefly described, in architecture, one embodiment of the system, among others, can be implemented as follows.

A layer height measuring device in one embodiment comprises a probe, an electronics unit, and a cable. The probe has a probe top and a probe bottom. The electronics unit cyclically transmits interrogation pulses to the probe and receives reflections therefrom for time domain reflectometric measurement of a layer in which the probe is immersed. The cable connects the electronics unit and the probe. Aliased sample collection is carried out by causing a synchronized delay between times that the interrogation pulses are transmitted and times that the received reflections are sampled to be swept through a series of values from an initial delay value to a final delay value over a plurality of the interrogation pulse cycles. The initial delay value may be set so as to substantially prevent collection of samples from reflections within a first region of noninterest and so as to substantially allow collection of samples from reflections within a first region of interest. The final delay value may be set so as to substantially allow collection of samples from reflections within a second region of interest and so as to substantially prevent collection of samples from reflections within a second region of noninterest.

The first region of noninterest may be a region before the probe top, such as all or any significant portion of the cable, and the initial delay value may be approximately the time domain length of the cable or may be not substantially more than the time domain length of the cable. The first region of interest and the second region of interest may respectively be all or any portion of the probe. The second region of noninterest may be a region after the probe bottom. The final delay value may be set so as to cause the aliased sample collection sweep to not extend substantially beyond the probe bottom. The final delay value less the initial delay value might be not substantially more than the time domain length of the probe. For example, when the initial delay value is set so as to be approximately the time domain length of the cable, the final delay value less the initial delay value might be approximately the time domain length of the probe or any portion thereof. Substantially all of the aliased sample collection is preferably carried out between a time when an interrogation pulse edge reflected from the probe top would have just arrived at the electronics unit and a time when the interrogation pulse edge reflected from the probe bottom would have just arrived at the electronics unit.

A layer height measuring system in another embodiment has a transmission line including a probe for measuring a height of a first layer within a tank and a cable that connects the probe to an electronics unit. The electronics unit cyclically transmits interrogation pulses to the probe and receives reflections therefrom for time domain reflectometric measurement of the height of the first layer. The layer height measuring system may also have a memory and a processor configured by the memory to perform the steps of detecting first and second impedance transitions corresponding to first and second boundaries of a bounded region of known length; optimizing a sweep offset and a sweep gain so as to cause swept sample collection to occur substantially only within the bounded region; and detecting a third impedance transition within the bounded region, the third impedance transition corresponding to an interface between the first layer and a second layer, the first and second layers having respectively different dielectric constants.

The bounded region of known length may be the probe. Where this is the case, the first and second boundaries of the bounded region may respectively be the probe top and the probe bottom, and the interface between layers having respectively different dielectric constants may be an air-liquid interface.

Alternatively, the bounded region of known length may be a liquid layer. Where this is the case, the first and second boundaries of the bounded region may respectively be the top and the bottom of the liquid layer, and the interface between layers having respectively different dielectric constants may be a liquid-liquid interface.

The height of at least one of the layers may be determined by converting a time domain height to a space domain height. The conversion may be carried out by an impedance-based compensation for dielectric constant. Alternatively, the conversion may be carried out by a time-based compensation for dielectric constant.

The height of the first layer may be measured directly using a spatial profile thereof or a time of flight therethrough. The height of the first layer may be measured indirectly by process of elimination from the known length of the bounded region less the measured height of the second layer.

The detection of the third impedance transition may be carried out using a spatial profile method when a signal-to-noise ratio thereof is good, and may be carried out using a time-of-flight method when the signal-to-noise ratio of the spatial profile method would be poor.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

DETAILED DESCRIPTION

Figure 1:
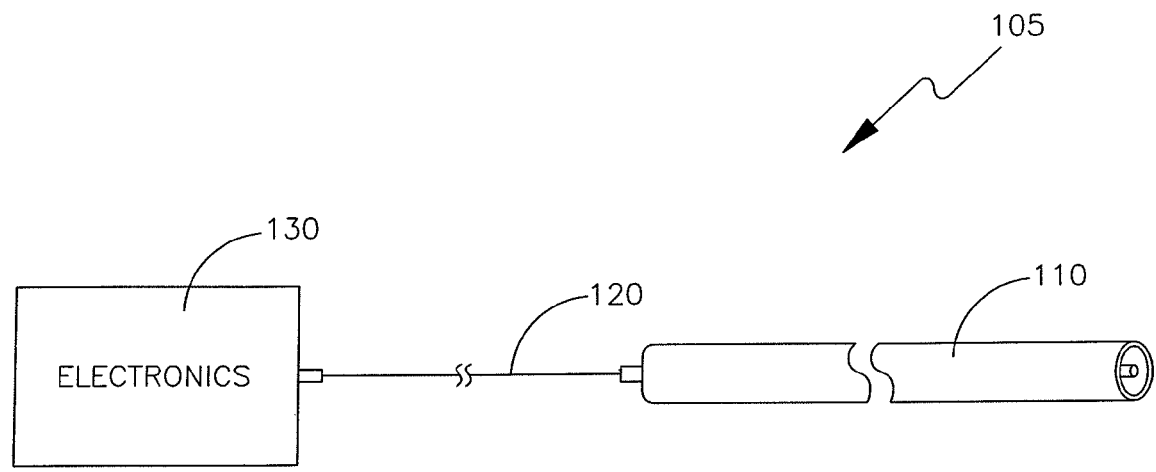
FIG. 1 is a schematic diagram illustrating a layer height measuring device in which a single TDR probe is connected to a single cable in accordance with a first exemplary embodiment of the invention.

The term "dielectric-constant-insensitive" as used herein in connection with time domain reflectometric measurement of the location of an interface between layers of dissimilar dielectric constant means not dependent on or sensitive to the absolute magnitude of the dielectric constant of at least one of a pair of layers forming the interface being detected. That is, while time domain reflectometric detection of an interface between layers of dissimilar dielectric constant in accordance with at least one embodiment of the present invention may legitimately be said to depend on or be sensitive to the relative magnitudes of the dielectric constants of the layers inasmuch as it is the transition between dissimilar dielectric constants that is being detected, it will often be the case that the height of at least one of the layers can be determined to reasonable accuracy without reliance on the absolute magnitude of the dielectric constant of that layer. For example, when a probe is present in a tank containing a first layer of known dielectric constant such as air over a second layer or mixture of layers of unknown dielectric constant, such as fuel of varying quality and chemical composition, it is in general possible to calculate the length of the portion of the probe that is immersed in the second layer from the known probe length and the length of the portion of the probe that is immersed in the first layer.

The term "immersion" as used herein to refer to contact of a layer with all or any portion of a probe is used without limitation with respect to the state of matter of the layer and without regard to direction relative to gravity. Note that the term "layer" as used herein to refer to any substance in contact with all or any portion of a probe is used without limitation with respect to state of matter and without regard to orientation relative to gravity. For example, the layer(s) in which the probe is immersed may include air and/or other gas(es) and/or miscible and/or immiscible liquid(s). Although the present document may distinguish between "layers" and "sublayers" where it is thought that such a distinction will aid in understanding, because what is a "sublayer" for purposes of description of one aspect of the present invention may become a "layer" for purposes of description of another aspect of the present invention, and vice-versa, these terms should be considered interchangeable except where the distinction is necessary for understanding.

The term "height" as used herein in its broadest sense may be used without regard to orientation relative to gravity and without limitation with respect to the location of the reference with respect to which that height is measured. For example, different embodiments of the present invention may variously measure the height of a gas-liquid or liquid-liquid interface relative to a tank bottom, relative to a different gas-liquid or liquid-liquid interface, or relative to any of various other detectable features. More commonly, however, where embodiments of the present invention deal with heights of liquid layers within a tank in which a TDR probe is oriented vertically or approximately vertically such that the direction of propagation of the interrogation pulse is more or less parallel to the direction of gravity, the "height" of a layer within that tank may be understood to be the dimension of the layer in the vertical direction, and what is referred to herein as a "height profile" may be understood to refer to the respective locations of the boundaries defining the height(s) of all or any subset of those layers. For example, such boundaries may include the tank bottom, the tank top, the probe bottom, the probe top, and any of the various gas-liquid and liquid-liquid interfaces that may exist between layers and sublayers. In the present invention, these boundaries are generally detectable by way of the impedance transitions that occur due to the change in dielectric constant as each such boundary is crossed.

The terms "known" and "unknown" as used herein to refer to layers of known or unknown dielectric constant, or of known or unknown length, are not intended to necessarily imply any particular degree of certainty or accuracy with which the dielectric constant or length of a particular layer is or is not known. Rather, in the context of a method employing process of elimination to ascertain heights of layers based on TDR measurements of interfaces present at the tops and/or bottoms of those layers, the terms "known" and "unknown" are instead intended to refer only to which of a plurality of layers is assumed to have known dielectric constant or length, and which of the plurality of layers is assumed to have unknown dielectric constant or length, for purposes of carrying out that process of elimination. For example, in one such process of elimination, height(s) of layer(s) of known dielectric constant are successively subtracted from known total probe length to determine the height of a layer of unknown or variable dielectric constant for which it is desired that TDR measurement be as insensitive to dielectric constant as possible. Where process of elimination is used to indirectly determine the height of a layer of unknown dielectric constant from known total probe length and the height(s) of layer(s) of known dielectric constant, for example, the method is said to be insensitive to the dielectric constant of the layer of unknown dielectric constant.

One aspect of the present invention is a TDR device for measuring liquid height within a tank. By optimizing sweep delay and aliasing in correspondence to the distance to and length of a TDR probe, this aspect of the present invention permits more efficient use of processing electronics, reduced sensitivity to temperature and dielectric constant, and improved resolution in detecting the heights of the various layers in which the TDR probe is immersed.

Referring to FIG. 1, this is a schematic diagram of a TDR device 105 for measuring liquid height in accordance with a first exemplary embodiment of the present invention. In the embodiment shown at FIG. 1, a single TDR probe 110 is connected by way of a single cable 120 to an electronics unit 130.

Note that the term "cable" is used herein as a convenient shorthand for the portion of the transmission line that connects the electronics unit 130 to the TDR probe 110, and should not be understood as limiting with respect to material, configuration, dimensions, or electrical or electromagnetic characteristics. Depending on the application in question, one of skill in the art will understand how to select the appropriate wire, waveguide, or other such medium to serve as the portion of the transmission line referred to for convenience herein as the cable 120. In addition, one of ordinary skill in the art would appreciate that the electronics unit 130 may instead communicate with the TDR probe 110 without use of a cable.

Furthermore, at FIG. 1, note that the broken line at the TDR probe 110 and the broken line at the cable 120 are intended to indicate that the length of each is indeterminate. That is, there is no particular restriction with respect to the length of the TDR probe 110 or the length of the cable 120, but it is preferred in one embodiment that the length of the TDR probe 110 (that is, the height of the liquid layer in which the TDR probe 110 is immersed when the tank is full of liquid, or the height of an air layer in which the TDR probe 110 is immersed when the tank is empty) be known. The length of the TDR probe 110 can be known using any appropriate method. For example, the length of the TDR probe 110 might be known as a result of having measured the height of a liquid layer in which the TDR probe 110 is immersed when the tank is full of liquid, or might be known as a result of having measured the height of an air layer in which the TDR probe 110 is immersed when the tank is empty. This known length of the TDR probe 110 may be used for dielectric-constant-insensitive determination of layer height as will be described in more detail below.

Moreover, at FIG. 1, note that even though the TDR probe 110 is more likely to be stood upright or approximately upright within the tank so that the long direction thereof is vertical or approximately vertical, the TDR probe 110 has for convenience been shown as horizontal at FIG. 1. That is, while it may be preferred that the TDR probe 110 is not exactly perpendicular to the tank bottom so as to minimize interference from reflections from the tank bottom, it will be preferred that the TDR probe 110 be placed in the tank so that the direction of propagation of the pulse (the long direction of the TDR probe 110 shown in FIG. 1) is approximately the same as the direction in which level of the liquid within the tank moves as the tank is filled and emptied (this usually being the direction of gravity).

Note that the TDR probe 110, cable 120, and electronics unit 130 have been shown in schematic form in FIG. 1. The configuration shown should not be understood as limiting. For example, there is no objection to use of TDR probe, cable, and/or electronics as described at commonly assigned U.S. nonprovisional patent application Ser. No. 12/243,511 entitled "System and Method for Accurately Measuring Fluid Level in a Tank" or as described at commonly assigned U.S. nonprovisional patent application Ser. No. 11/650,841 entitled "Scan Lock and Track Fluid Characterization and Level Sensor Apparatus and Method."

Figure 2:
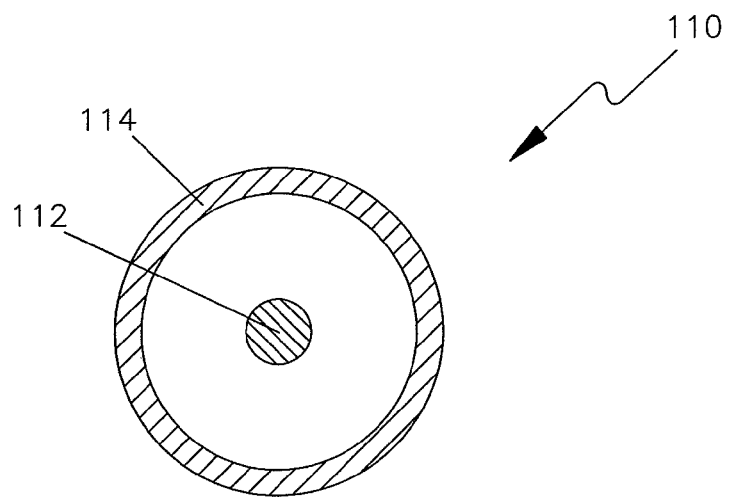
FIG. 2 is a bottom view of the probe of FIG. 1.

Referring to FIG. 2, this shows a bottom view of the TDR probe 110 of FIG. 1. As shown in FIG. 2, the TDR probe 110 of the first embodiment is a coaxial probe having an inner conductor 112 and an outer conductor 114. When the TDR probe 110 is made to stand upright or approximately upright within the tank, there is preferably little or no capillary action, so that as liquid within the tank partially fills the space between the inner conductor 112 and the outer conductor 114 of the TDR probe 110, that liquid rises to a height within the TDR probe 110 that is substantially the same as the level of the liquid within the tank. Although a coaxial TDR probe 110 is shown, there is no particular objection to employment of probes of different configuration, such as, for example, a single-conductor probe.

As clear from the bottom view shown in FIG. 2, the probe bottom (point farthest from the electronics unit 130) is electrically open in the present embodiment. Furthermore, in the present embodiment, the impedance of the cable 120 might be on the order of 50 ohms, and a representative impedance of the TDR probe 110 at mid-length therealong might be on the order of 86 ohms (when the tank is empty and contains only air, for example), so that there is an impedance transition of 50 ohms to 86 ohms at the probe top (point closest to the electronics unit 130). With such a TDR probe 110, the impedance transition of the electrically open probe bottom will create a strong TDR pulse reflection, and the impedance transition at the connection between the cable 120 and the probe top will create a strong TDR pulse reflection.

During operation, an interrogation pulse is transmitted from a transmitter located, for example, at the electronics unit 130. This interrogation pulse propagates along the cable 120 and the TDR probe 110, and is reflected at any impedance discontinuities present therealong. Such reflected pulses are received by a receiver located, for example, at the electronics unit 130, the distances to the impedance discontinuities that caused the reflections being capable of being determined from observed round-trip propagation times by digital signal processing electronics located at the electronics unit 130.

Here, an aliasing sampling system is preferably employed. In such an aliasing sampling system, the interrogation pulse is transmitted in cyclical fashion at a frequency on the order of 1 MHz, for example, and a swept phase shift or delay is introduced between the time that the interrogation pulse is transmitted and the time that a sample is captured. In this way, with times on the order of one microsecond between successive 1 MHz pulses, digital signal processing electronics present at the electronics unit 130 will have a chance to recover between samples, and the desired resolution can be achieved by sweeping, or incrementally increasing with each successive cycle, the delay (phase shift) between pulse transmission and sample capture. The train of samples captured at times corresponding to the swept increase in phase shift can be said to exhibit aliasing, since the net effect of combining the constant interrogation pulse frequency with the swept sampling frequency is to produce a microsecond-order version of the picosecond-order waveform, the progressively delayed sampling occurring due to the swept phase shift appearing as a "beat frequency" that is slow enough to be captured and processed by the digital signal processing electronics.

In the embodiment shown in FIG. 1, the cable 120, here shown as having indeterminate length, that connects the TDR probe 110 to the electronics unit 130 may have at least two potentially adverse effects, unless measures are taken to address these effects.

One potentially adverse effect is the contribution that the cable 120 will have on the sensitivity of the TDR device 105 with respect to dielectric constant, and thus to such factors as temperature, unless steps are taken to prevent this. That is, the medium serving as the cable 120 can be characterized as having a representative dielectric constant; and since dielectric constant is, in general, a function of temperature, this dielectric-constant-sensitivity of the cable 120 will contribute to the dielectric-constant-sensitivity (and thus to the temperature sensitivity) of the TDR device 105, unless steps are taken to prevent this.

Another potentially adverse effect is the reduction in response time and/or resolution that will result from wasting available processing capacity on collection of samples arriving at the receiver from reflections by impedance discontinuities along the cable 120, unless steps are taken to prevent this. That is, since it is the impedance discontinuities in the region of the TDR probe 110 that contain information about the heights of the various layers in which the TDR probe 110 is immersed within the tank, any time spent processing samples originating from regions other than the TDR probe 110 contributes to inefficiency and thus impairs response time and/or resolution. This impairment of response time and/or resolution will be especially significant when the cable 120 is long, unless steps are taken to prevent this.

Further aggravating this second potentially adverse effect is the fact that processing time is in fact likely to be a limiting factor on response time and resolution when affordable electronics and practical designs are employed. That is, in an exemplary embodiment employing an interrogation pulse of frequency 1 MHz, for example, several thousand samples might be collected over the course of several milliseconds if one sample were to be collected at every 1 MHz pulse and each such sample was usable by the digital signal processing electronics. However, to achieve an acceptable signal-to-noise ratio, it is found in practice that multiple raw samples must preferably be averaged together or otherwise processed by fast analog filtering electronics, located for example at the electronics unit 130, to create a single filtered sample that is then collected by the digital signal processing electronics located at the electronics unit 130. That is, it is preferred that sampling actually be occurring at two levels, with raw samples being averaged together or otherwise filtered, and the filtered samples then being collected by the digital electronics. Allowing time for filtering to be carried out between the samples collected by the digital electronics can easily result in times on the order of 500 microseconds between successive filtered samples. This being the case, at 500 microseconds per sample, several thousand samples would, for example, take on the order of several seconds to collect. Where rapid response time and good resolution are desired, it is therefore preferred that collection of these samples not be wasted on the region corresponding to the cable 120 but instead be performed substantially only when within the region corresponding to the TDR probe 110.

To prevent these two potentially adverse effects, the present embodiment preferably optimizes sweep delay and/or aliasing to match the cable 120 and the TDR probe 110.

That is, aliased sample collection is carried out by causing a synchronized delay between times that the interrogation pulses are transmitted and times that the received reflections are sampled to be swept through a series of values from an initial delay value to a final delay value over a plurality of the interrogation pulse cycles.

However, unlike conventional TDR systems in which the initial delay value is set to zero or a value so small that sample collection essentially starts at the beginning of the transmission line, the initial delay value in one embodiment of the present invention is set so as to substantially prevent collection of samples from reflections within a first region of noninterest and so as to substantially allow collection of samples from reflections within a first region of interest. For example, the first region of interest might be all or any portion of the TDR probe 110, the first region of noninterest might be a region before the probe top, such as all or any significant portion of the cable 120, and the initial delay value might be set so as to be approximately the time domain length of the cable 120.

Furthermore, unlike conventional TDR systems in which the final delay value is set to a value so large that sample collection continues significantly beyond the end of the transmission line, which is typically the approximate probe bottom, the final delay value in one embodiment of the present invention is set so as to substantially allow collection of samples from reflections within a second region of interest and so as to substantially prevent collection of samples from reflections within a second region of noninterest. For example, the second region of interest might be all or any portion of the TDR probe 110, the second region of noninterest might be a region after the probe bottom, and the final delay value might be set so as to cause the aliased sample collection sweep to not extend substantially beyond the probe bottom. The final delay value less the initial delay value is preferably not substantially more than the time domain length of the TDR probe 110. For example, when the initial delay value is set so as to be approximately the time domain length of the cable 120, the final delay value might be set so as to cause the final delay value less the initial delay value to be approximately the time domain length of the probe or any portion thereof. Furthermore, substantially all of the aliased sample collection is preferably carried out between a time when an interrogation pulse edge reflected from the top of the TDR probe 110 would have just arrived at the electronics unit 130 and a time when an interrogation pulse edge reflected from the bottom of the TDR probe 110 would have just arrived at the electronics unit 130.

For example, with respect to optimization of sweep offset, this might be carried out as follows. That is, it was described above that a swept phase shift or delay is introduced between pulse transmission and sample capture. Whereas this swept sample capture might conventionally begin at the time that the interrogation pulse has been sent, it is preferred in the present embodiment that an offset be introduced before sample collection begins, and that this offset be optimized to match the (time domain) length of the cable 120. What is referred to herein as an offset is a time that is waited before beginning the sample collection sweep, and it is preferred that this offset be chosen so as to cause each sweep of aliased sample collection to begin at the approximate probe top. This being the case, employment of the offset will substantially eliminate sample collection within the region corresponding to the cable 120. Because TDR generally measures roundtrip rather than one-way propagation times, and because it may be desired that aliased sample collection begin slightly before receipt of the reflection from the probe top, the term "match" or "matching" as used in this context should be understood in the broad sense of choosing an offset that is optimal in light of the (time domain) length of the cable 120. As explained above, what is referred to herein as the cable 120 is shorthand employed for convenience to refer to that portion between the TDR probe 110 and the electronics unit 130 in the broadly defined transmission line that includes the cable 120 as well as the TDR probe 110. Note that the sample collection that is referred to here is collection of samples by the digital signal processing electronics. There is no particular objection to carrying out raw sample collection and/or filtering as desired where this can be done quickly with affordable electronics.

In the present embodiment, the optimized offset approximately corresponds to the roundtrip signal propagation time along the cable 120. This offset may be calculated from the length and dielectric constant of the cable 120. Alternatively, the region corresponding to the cable 120 plus the TDR probe 110 might be scanned using TDR, and the elapsed time from transmission of the interrogation pulse until receipt of the reflection from the impedance transition between the cable 120 and the TDR probe 110 (this impedance transition may be taken to mark the probe top) might be employed as the offset, or a time slightly shorter than this might be employed as the offset so as to ensure that the probe top is adequately represented in the captured samples.

This optimizable sweep offset may, for example, be implemented by means of an RC circuit having a time constant suitable for achieving the desired offset. Furthermore, the time constant of such an RC circuit might be made variable through employment of a variable potentiometer, for example. Alternatively, the optimizable offset might be implemented by means of a programmable delay line. Although there is no particular objection to employment of a fixed or nonvariable offset that has been chosen to match a particular cable 120, employment of a variable offset will not only allow for adjustment to compensate for the effect of temperature on the dielectric constant of the cable 120 but will also allow for convenient adjustment to accommodate a wide variety of cables 120 of different sizes and configurations.

Furthermore, with respect to optimization of sweep gain, this might be carried out as follows. That is, it was described above that the train of samples captured at times corresponding to the swept increase in phase shift exhibits aliasing. Whereas this aliasing might conventionally be carried out only with the goal of effectively slowing down or expanding the impedance-versus-time waveform to the point where it is slow enough to be handled by affordable digital signal processing electronics, it is preferred in the present embodiment that a gain be defined with respect to this aliasing, and that this gain be optimized to match the (time domain) length of the TDR probe 110. That is, what is referred to herein as a gain is the size of the incremental increase in the delay or phase shift as each successive sample is collected during one sweep of swept sample collection, and it is preferred that this gain be chosen so as to cause each sweep of sample collection to end at the approximate probe bottom. If the offset is optimized as described above so as to cause the sweep to begin at the approximate probe top, this means that the gain is preferably chosen so as to cause the differences or increments between successive delay times during one sweep to sum to the approximate time domain length (sometimes referred to as perceived length) of the TDR probe 110. Because TDR generally measures roundtrip rather than one-way propagation times, and because it may be desired that aliased sample collection end slightly after receipt of the reflection from the probe bottom so as to ensure that the probe bottom is adequately represented in the captured samples, the term "match" or "matching" as used in this context should be understood in the broad sense of choosing a gain that is optimal in light of the (time domain) length of the TDR probe 110. Note that the sample collection that is referred to here is collection of samples by the digital signal processing electronics. There is no particular objection to carrying out raw sample collection and/or filtering as desired where this can be done quickly with affordable electronics.

Because the time domain length of the TDR probe 110 changes as a function of tank content, including liquid layer height (which may change as fuel in the fuel tank is consumed, for example), setting of the gain for optimization of aliasing in one embodiment is preferably done when the contents of the TDR probe 110 produce the longest time domain length expected to occur during normal operation. This will ensure that the collected samples encompass the entire region corresponding to the TDR probe 110 under all circumstances expected to be encountered during normal operation. Alternatively, the gain setting may be periodically reoptimized as tank content changes so that the sample collection window is adjusted to follow the changing time domain length of the TDR probe 110.

That is, where it is desired to collect samples, such as for the purpose of creation of impedance-versus-time traces, that encompass the probe top and the probe bottom, the offset between the time that the interrogation pulse is transmitted and the time that swept sample collection begins (sweep offset) is in one embodiment preferably chosen so as to cause sample collection to start at or slightly prior to a time when a pulse reflected from the top of the TDR probe 110 would have just arrived at the electronics unit 130. Furthermore, the size of the increment in the delay between successive swept samples (sweep gain) is in one embodiment preferably chosen so that, given a reasonable number of samples that can be collected and processed with satisfactory response time, the last of the samples is collected at or slightly after a time when a pulse reflected from the bottom of the TDR probe 110 would have just arrived at the electronics unit 130. By so doing, it is possible to optimize sweep delay and aliasing so as to permit maximum resolution of the impedance variations occurring along the length of the TDR probe 110 in correspondence to the available sample processing capacity of the electronics unit 130.

This optimizable sweep gain may, for example, be implemented by means of an RC circuit having a time constant suitable for achieving the desired gain. Furthermore, the time constant of such an RC circuit might be made variable through employment of a variable potentiometer, for example. Alternatively, the optimizable gain might be implemented by means of a programmable delay line. Although there is no particular objection to employment of a fixed or nonvariable gain that has been chosen to match a particular TDR probe 110 and tank content, employment of a variable gain will allow for convenient adjustment to accommodate a wide variety of TDR probes 110 of different sizes and configurations for use in tanks intended hold a wide variety of contents over a wide range of temperatures.

Figure 3:
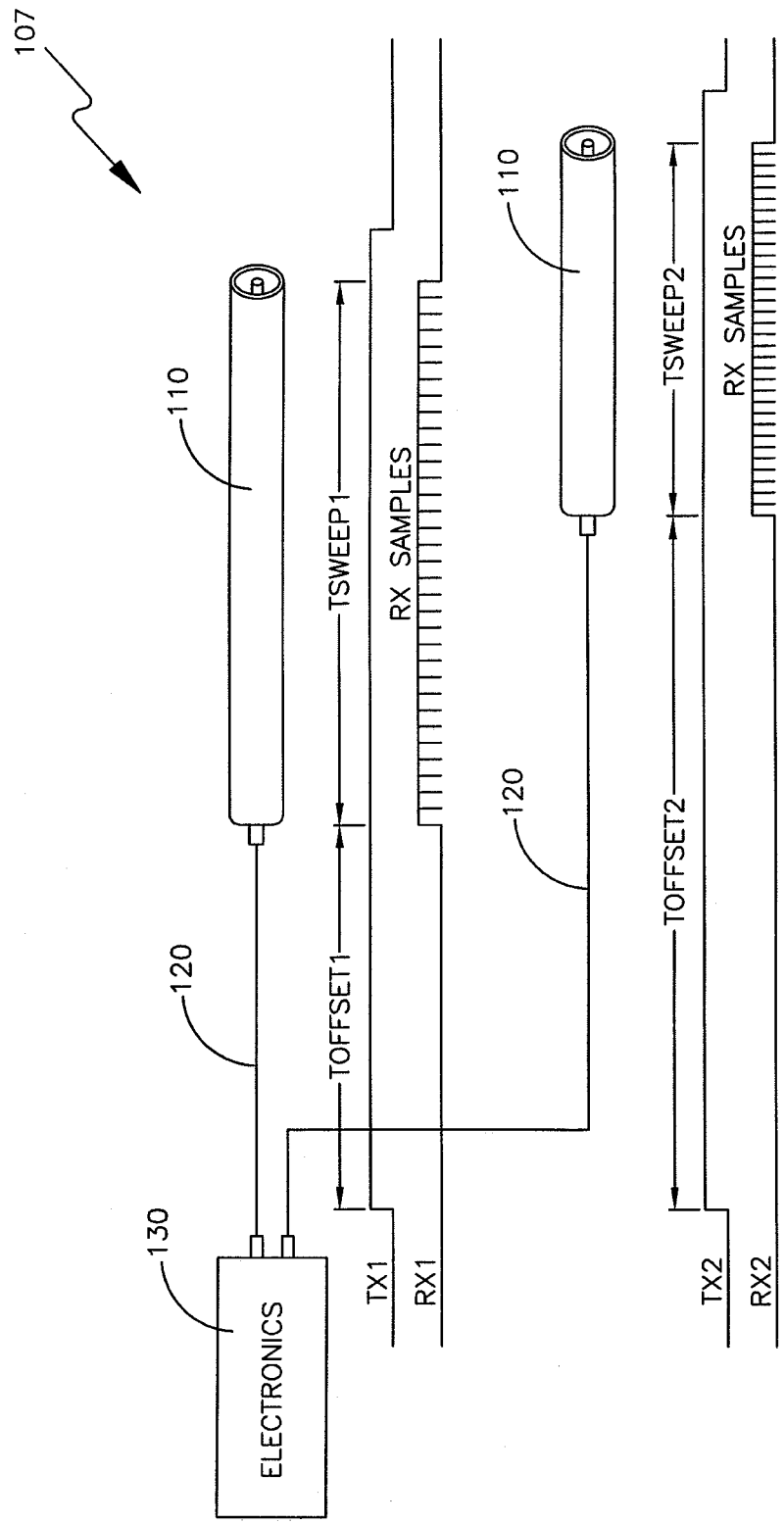
FIG. 3 is a schematic diagram illustrating a layer height measuring device in which multiple TDR probes are connected to multiple cables in accordance with a second exemplary embodiment of the invention.

This is shown schematically at FIG. 3 for a TDR device 107 for measuring liquid height in accordance with a second exemplary embodiment of the present invention. In the second embodiment shown at FIG. 3, multiple (here, two) TDR probes 110 are connected by way of multiple (here, two) cables 120 to the same electronics unit 130.

The TDR probes 110, cables 120, and electronics unit 130 in the second embodiment shown in FIG. 3 are similar to those in the first embodiment shown in FIG. 1, except that in the second embodiment shown in FIG. 3 the TDR probes 110 may be of respectively different lengths, and the cables 120 may be of respectively different lengths. Although the tanks in which the TDR probes 110 are placed are not shown at FIGS. 1 and 3, it should be noted that the TDR probes 110 shown in FIG. 3 may be placed in the same or different tanks that are intended to contain the same or respectively different liquids when full. Although it will be assumed for convenience of description that the TDR probes 110 shown in FIG. 3 are of the same configuration (except for their respectively different lengths) and have the same impedance (when the tanks in which they are placed are respectively empty, for example), there is no particular objection to employment of TDR probes 110 having respectively different configurations and/or impedances. Similarly, although it will be assumed for convenience of description that the cables 120 shown in FIG. 3 are of the same configuration (except for their respectively different lengths) and have the same impedance, there is no particular objection to employment of cables 120 having respectively different configurations and/or impedances.

At FIG. 3, the cable-probe system in the upper portion of the drawing will be referred to as a first cable-probe system, and the cable-probe system in the lower portion of the drawing will be referred to as a second cable-probe system. Note that the first cable-probe system has a comparatively short cable 120 but a comparatively long TDR probe 110. Note also that the second cable-probe system has a comparatively long cable 120 but a comparatively short TDR probe 110.

Shown schematically below each cable-probe system in FIG. 3 is an amplitude-versus-time trace of an interrogation pulse transmitted from a transmitter located at the electronics unit 130, this transmitted pulse being indicated by the symbol Tx1 for the first cable-probe system, and by the symbol Tx2 for the second cable-probe system. In the example shown in FIG. 3, the transmitted interrogation pulses Tx1 and Tx2 respectively go high at time zero, and stay high until well after the reflection from the probe bottom has arrived at a receiver located at the electronics unit 130.

Also shown schematically below each cable-probe system in FIG. 3 is an amplitude-versus-time trace of a receive sample signal for directing the receiver at the electronics unit 130 to collect samples for digital signal processing, this receive sample signal being indicated by the symbol Rx1 for the first cable-probe system, and by the symbol Rx2 for the second cable-probe system.

Figure 4:
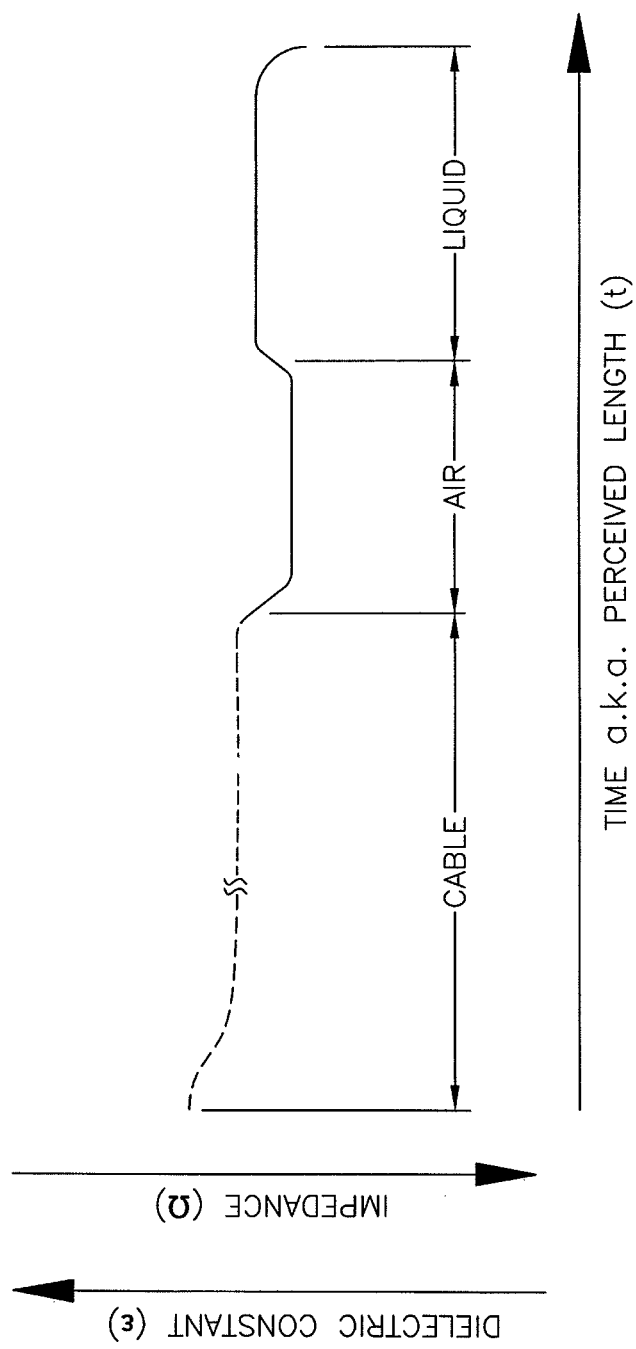
FIG. 4 is a representative impedance-versus-time trace such as might be obtained from a TDR probe immersed in a partially full tank containing a single liquid layer (no stratification into liquid sublayers).
Figure 5:
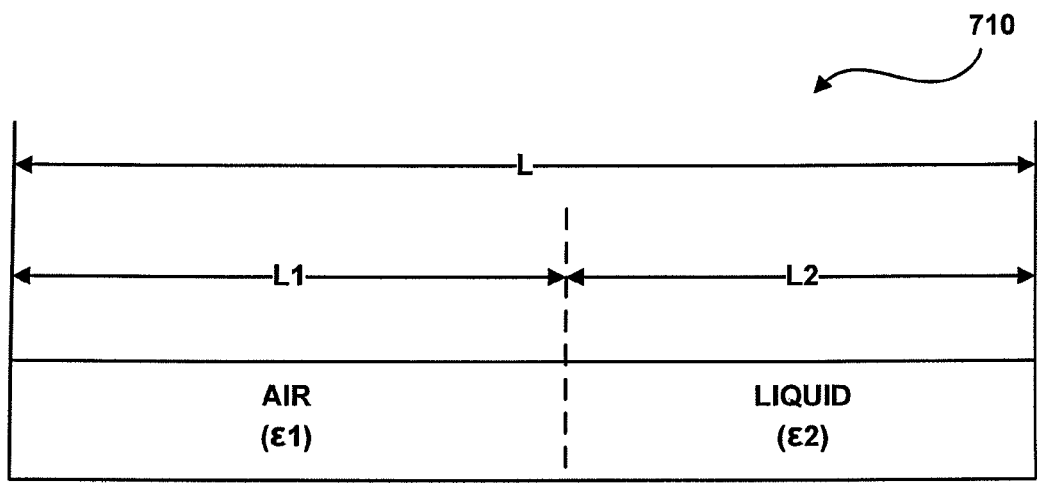
FIG. 5 is a diagram showing a schematic representation of the heights and dielectric constants of the air layer and the liquid layer in which the probe is immersed in the example of FIG. 4.
Figure 7:
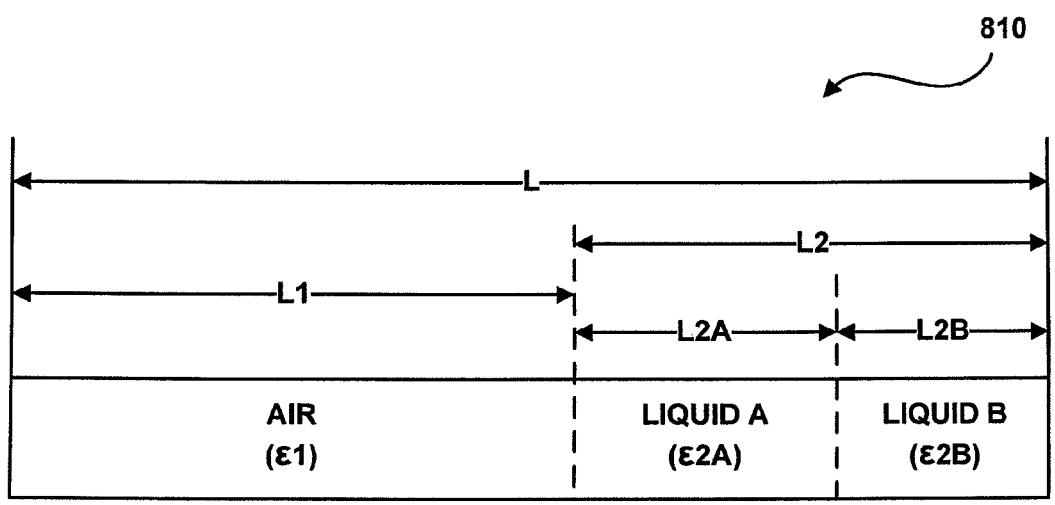
FIG. 7 is a diagram showing a schematic representation of the heights and dielectric constants of the air layer and of the liquid sublayers in which the probe is immersed in the example of FIG. 6.
Figure 6:
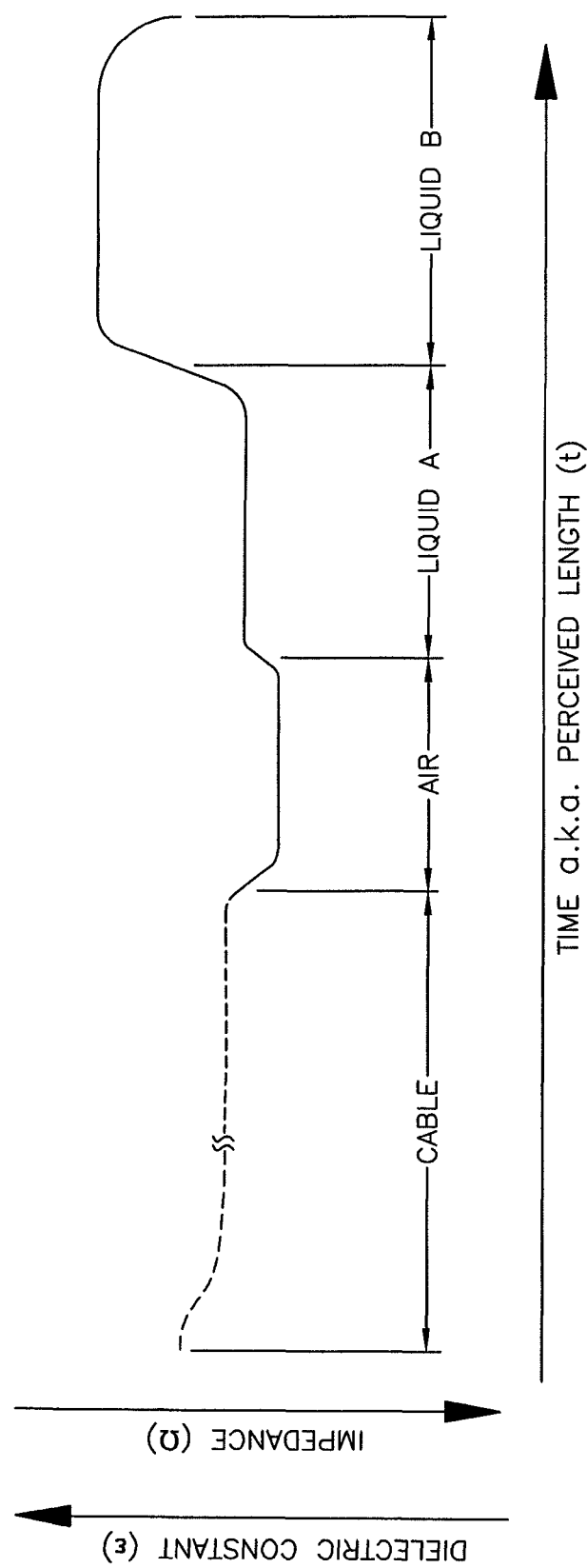
FIG. 6 is a representative impedance-versus-time trace such as might be obtained from a TDR probe immersed in a partially full tank containing multiple stratified liquid sublayers.

At the signal diagrams shown in FIG. 3, the trace diagrams shown in FIGS. 4 and 6, and the layer height profiles shown in FIGS. 5 and 7, note that in juxtaposing time domain signal traces with illustrations and legends indicating physical lengths of cables and probes, and of liquid and air layers within those probes, some liberties have been taken for convenience of illustration. For example, at FIG. 3, even though the dielectric constants of the cable 120 and the TDR probe 110 would likely be different (these being respectively 50 ohms and 86 ohms for an empty probe in the example given above), and would therefore produce different velocities of propagation in the different media, times at signal diagrams Tx1, Rx1, Tx2, Rx2 have for convenience of illustration been shown as if velocity of propagation is more or less the same everywhere. Furthermore, at FIG. 3, although no time scale is given, since juxtaposition of times with cable/probe lengths might suggest otherwise, note that it is generally roundtrip signal propagation times that are actually measured by TDR. Similarly, although comparison of FIG. 4 with FIG. 5, and FIG. 6 with FIG. 7, might suggest otherwise, the time domain lengths shown in FIGS. 4 and 6 should be understood to differ from the space domain lengths shown in FIGS. 5 and 7 in these two regards; that is, the fact that there are different velocities of propagation due to different dielectric constants in different media, and the fact that it is roundtrip propagation times that are measured by TDR. This being the case, where time domain lengths are referred to herein, these should generally be understood to refer to roundtrip propagation times, except where otherwise clear from context.

Note that the signal diagrams in FIG. 3 are shown on an aliased time scale. That is, each of the samples indicated by a vertical tick mark within the "Rx samples" envelope, shown beneath the TDR probes 110 in FIG. 3, is actually collected during a separate interrogation cycle, but aliasing causes the train of samples to be effectively concatenated together into a single aliased waveform.

In the example shown in FIG. 3, Toffset1 indicates a first offset time for the first cable-probe system that is set so as to cause aliased sample collection to start at or slightly prior to a time when an interrogation pulse edge (here the leading edge) reflected from the top of the first TDR probe 110 would have just arrived at the electronics unit 130. Similarly, Toffset2 indicates a second offset time for the second cable-probe system that is set so as to cause aliased sample collection to start at or slightly prior to a time when an interrogation pulse edge (here the leading edge) reflected from the top of the second TDR probe 110 would have just arrived at the electronics unit 130.

Furthermore, Tsweep1 indicates a first sweep time for the first cable-probe system that is set by a first gain so as to cause aliased sample collection to end at or slightly after a time when an interrogation pulse edge (here the leading edge) reflected from the bottom of the first TDR probe 110 would have just arrived at the electronics unit 130. Similarly, Tsweep2 indicates a second sweep time for the second cable-probe system that is set by a second gain so as to cause aliased sample collection to end at or slightly after a time when an interrogation pulse edge (here the leading edge) reflected from the bottom of the second TDR probe 110 would have just arrived at the electronics unit 130. As can be seen at FIG. 3, the first and second gains act to relatively expand or compress the size of the increment between successive delay times during one sweep of aliasing sample collection, and thus to relatively expand or compress the sum of these increments between successive delay times during one sweep of aliasing sample collection, this sum of successive delay times during one sweep of aliasing sample collection being what is referred to herein as sweep time. That is, increasing the gain causes sweep time to increase by a factor as large as the number of samples collected in one sweep, and a larger sweep time means that the same number of samples is now spread out to permit sample collection to take place over a longer probe (time domain) length. More generally, the increase in sweep time is proportional to the size of the increment in the delay between successive swept samples (sweep gain), the constant of proportionality being the number of samples collected in one sweep.

It is therefore preferred especially when the cable 120 is long compared to the TDR probe 110, that an offset be employed as described above so that processing capacity is not wasted on samples collected within the region corresponding to the cable 120. Furthermore, where such an offset is employed, it is preferred that the offset be large enough to substantially prevent collection of samples within the region corresponding to the cable 120 but not so large as to substantially interfere with collection of samples within the region corresponding to the TDR probe 110. Specifically, it is preferred that the initial delay value (offset) be set so as to cause the aliased sample collection sweep to begin not more than 50% of the time domain length of the TDR probe 110 before the top of the TDR probe 110. It is more preferred that the initial delay value (offset) be set so as to cause the aliased sample collection sweep to begin not more than 25% of the time domain length of the TDR probe 110 before the top of the TDR probe 110. It is still more preferred that the initial delay value (offset) be set so as to cause the aliased sample collection sweep to begin not more than 5% of the time domain length of the TDR probe 110 before the top of the TDR probe 110. For example, in one embodiment, the offset might be approximately the time domain length of the cable 120.

Moreover, it is preferred that a gain be employed as described above so that aliasing is optimized to match the time domain length of the TDR probe 110. Furthermore, where such a gain is employed, it is preferred that the gain be large enough to substantially allow collection of samples within the region corresponding to the TDR probe 110 but not so large as to substantially cause collection of samples beyond the bottom of the TDR probe 110. Specifically, it is preferred that the final delay value (or the gain, which effectively determines the final delay value once the initial delay value is known) be set so as to cause the aliased sample collection sweep to end not more than 50% of the time domain length of the TDR probe 110 after the bottom of the TDR probe 110. It is more preferred that the final delay value (or the gain) be set so as to cause the aliased sample collection sweep to end not more than 25% of the time domain length of the TDR probe 110 after the bottom of the TDR probe 110. It is still more preferred that that the final delay value (or the gain) be set so as to cause the aliased sample collection sweep to end not more than 5% of the time domain length of the TDR probe 110 after the bottom of the TDR probe 110. For example, in an embodiment in which the initial delay value (offset) is set so as to be approximately the time domain length of the cable 120, the final delay value might be set so as to cause the final delay value less the initial delay value to be approximately the time domain length of the probe or any portion thereof.

Note that where time domain lengths of the TDR probe 110 are mentioned above in connection with preferred ranges for employment of offsets and gains in accordance with the present embodiment, these time domain lengths may be understood to refer to the current time domain length of the TDR probe 110 when reoptimization is periodically carried out as described above, or these time domain lengths may be understood to refer to the time domain length of the TDR probe 110 as measured when the tank is empty (contains only air), as measured when the tank is full (contains the maximum intended quantity of the liquid or liquids expected to be present during normal operation), or as measured when in a state that produces the longest time domain length for the TDR probe 110 that is expected to occur during normal operation, as may be preferred depending on the application in question.

Similarly, where time domain lengths of the cable 120 are mentioned above in connection with preferred ranges for employment of offsets and gains in accordance with the present embodiment, these time domain lengths may be understood to refer to the current time domain length of the cable 120 when reoptimization is periodically carried out as described above, or these time domain lengths may be understood to refer to the time domain length of the cable 120 as measured at the hottest temperature expected to occur during normal operation, as measured at the coldest temperature expected to occur during normal operation, as measured at the average or normal temperature expected to occur during normal operation, or as measured when in a state that produces the longest time domain length for the cable 120 that is expected to occur during normal operation, as may be preferred depending on the application in question.

By thus optimizing sweep delay and aliasing to match the cable 120 and the TDR probe 110, it is possible to achieve more efficient use of processing capacity, reduced sensitivity to temperature and dielectric constant (especially of the cable 120), and improved resolution in detecting the heights of the various layers in which the TDR probe 110 is immersed. This is especially the case when for reason of convenience or safety there are significant lengths of cable 120 between the electronics unit 130 and probe(s) 110.

Furthermore, in systems such as that shown in FIG. 3 where multiple transmission lines contain multiple cables 120 connected to multiple probes 110 in multiple tanks of varying size and content, and these multiple transmission lines are coupled to the same electronics unit 130, for example in multiplexed or time-shared fashion by an RF switch, the different lengths and characteristics of the respective cables 120, the different lengths and characteristics of the respective probes 110, and the different contents of the respective tanks would, without some special adapter or other stratagem, cause probe top reflected pulse arrival time and probe bottom reflected pulse arrival time to vary in accordance with the different cable-probe-tank systems. By thus optimizing sweep delay and aliasing to match the cable 120 and the TDR probe 110 separately for each cable-probe-tank system that is coupled to the same electronics unit 130 (or multiple instances of the same electronics unit, where this is more practical to implement), it is possible to conveniently adapt the electronics unit 130 to each cable-probe-tank system, or adapt each cable-probe-tank system to the electronics unit 130, so that the train of collected samples covers the range from the approximate probe top to the approximate probe bottom regardless of cable length and other characteristics, regardless of probe length and other characteristics, and regardless of tank content. This makes it possible for the same electronics unit 130 to be able to be used with a wide variety of cable-probe-tank systems.

Referring to FIGS. 4 and 6, these respectively show impedance-versus-time traces as might be detected by TDR probes 110 as described above with reference to the first and second embodiments when the height profiles of the various layers in which the TDR probes 110 are immersed are respectively as indicated at FIGS. 5 and 7. At FIGS. 5 and 7, note that, just as the TDR probes 110 were for convenience shown horizontally at FIGS. 1 and 3, the height profiles of the various layers in which the TDR probes 110 are immersed are for convenience shown horizontally. That is, at FIGS. 5 and 7, the top of the tank would be at the left in the drawing and the bottom of the tank would be at the right in the drawing. Furthermore, at FIGS. 5 and 7, the probe top is taken to be in the direction of the tank top (left in the drawing), and the probe bottom is taken to be in the direction of the tank bottom (right in the drawing). At FIGS. 5 and 7, note that the vertical solid lines at far left and far right in the drawing respectively indicate the probe top and the probe bottom (here respectively taken to be more or less coincident with the tank top and the tank bottom), while vertical dashed lines intermediate therebetween respectively indicate interfaces between various pairs of layers. Note that, except where otherwise clear from context, the terms "height" and "length" are used interchangeably herein.

Note at FIGS. 4 and 6 that the trace is shown in dashed line in the cable region to indicate that this region is preferably ignored (sample collection is preferably not carried out therein) as a result of employment of an offset that is appropriately optimized as described above. Moreover, note that the broken line in the cable region is intended to indicate that the length of the cable 120 is indeterminate (there is no particular limitation with respect to the length of the cable 120). Also note that at FIGS. 4 and 6 where the vertical axis is labeled with arrows indicating directions of increasing impedance and of increasing dielectric constant, these are not necessarily shown to scale but are rather intended only for indicating the respective directions of increasing magnitude (for example, if liquid B at FIG. 6 were in fact water as suggested in the example given below, depending on calibration and the particular equipment employed, the very low impedance, or very high dielectric constant, of water might well cause the y-axis component of the trace in the liquid B region to have a significantly higher value than is shown). Furthermore, note that although the leading edges of the transmitted interrogation pulses Tx1 and Tx2 at FIG. 3 are shown as being positive-going, the impedance-versus-time traces shown in FIGS. 4 and 6 might in practice be more easily produced from transmitted interrogation pulses Tx1 and Tx2 having negative-going leading edges.

At the single-liquid layer height profile 710 shown in FIG. 5, a TDR probe 110 having a total height L is partially immersed in a layer of air having height L1 and dielectric constant ∈1, and is partially immersed in a layer of liquid having height L2 and dielectric constant ∈2. As can be seen at FIG. 4, an impedance-versus-time trace obtained by carrying out TDR as described above will, for the single-liquid layer height profile 710 shown in FIG. 5, have regions along the time axis (horizontal or x-axis) that respectively correspond to the cable 120, the air layer, and the liquid layer.

At the multiple-liquid layer height profile 810 shown in FIG. 7, a TDR probe 110 having a total height L is partially immersed in a layer of air having height L1 and dielectric constant ∈1, and is partially immersed in a layer of liquid having height L2, as was the case with the single-liquid layer height profile 710. Unlike the single-liquid layer height profile 710 of FIG. 5, however, the liquid layer of height L2 in the multiple-liquid layer height profile 810 of FIG. 7 comprises a sublayer of liquid A having height L2A and dielectric constant ∈2A, and a sublayer of liquid B having height L2B and dielectric constant ∈2B. As can be seen at FIG. 6, an impedance-versus-time trace obtained by carrying out TDR as described above will, for the multiple-liquid layer height profile 810 shown in FIG. 7, have regions along the time axis (horizontal or x-axis) that respectively correspond to the cable 120, the air layer, the liquid A layer, and the liquid B layer.

Note that the time domain (perceived) lengths of the cable 120, the air layer, and the liquid layer(s) will be functions not only of their physical (space domain) lengths but also of their dielectric constants in accordance with the relationship $$d \propto \frac{t}{\sqrt{\varepsilon}}$$

where d=distance (space domain length), t=time (time domain length), and ∈=dielectric constant.

Similarly, these impedance-versus-time traces will have regions along the impedance axis (vertical or y-axis) that respectively correspond to the cable 120, the air layer, and the liquid layer(s). For example, for a TDR probe 110 having a configuration as described above with reference to FIGS. 1 through 3, y-axis values in the cable region of the trace might correspond to impedances on the order of 50 ohms, y-axis values in the air region of the trace might correspond to impedances on the order of 86 ohms, and y-axis values in the liquid region of the trace might correspond to impedances on the order of 55 ohms where the liquid is hydrocarbon fuel (liquid A), or might correspond to impedances on the order of 10 ohms where the liquid is water (liquid B). Because dielectric constant in inversely correlated to impedance, meaning that dielectric constant decreases with increasing impedance and vice-versa, the vertical axis of these impedance-versus-time traces can be understood to indicate dielectric constant if its sense is reversed and it is recalibrated so as to render y-axis values along a scale appropriate for dielectric constant.

As can be seen at FIGS. 4 and 6, the electrically open probe bottom represents a sharp impedance transition producing a very strong reflection that can easily be detected. Where the top layer in the TDR probe 110 is air, as at FIGS. 4 and 6, the sharp impedance transition at the probe top where the cable 120 transitions to the air layer portion of the TDR probe 110, also produces a strong reflection that can generally be detected (detection of the probe top can be facilitated by choosing a cable 120 having a dielectric constant that is sufficiently dissimilar from that of the top layer). The air-liquid interfaces and liquid-liquid interfaces can be more difficult to detect depending on how similar or dissimilar the dielectric constants of the layers straddling the interface are, but these should also be capable of being detected when spatial resolution is improved by optimizing sweep delay and aliasing as described above.

As explained in more detail below, in accordance with a system for time domain reflectometric measurement of layer height within a tank, the impedance transitions at the probe top and probe bottom, and at the interfaces between pairs of layers, can be automatically detected by appropriately written algorithms. Where such a system furthermore automatically carries out optimization of sweep delay and aliasing as described above, this will permit more efficient use of processing electronics, reduced sensitivity to temperature and dielectric constant, and improved resolution in detecting the heights of the various layers in which the TDR probe is immersed. Where such a system moreover automatically matches electronics and cable-probe-tank systems, this will seamlessly permit the same electronics unit (or multiple instances of the same electronics unit, where this is more practical to implement) to be used with multiple cable-probe-tank systems. Furthermore, embodiments of such a system in which improved height profile detection resolution made possible by optimization of sweep delay and aliasing is combined with intelligent functionality that leverages known parameters to determine unknown parameters and selectively applies appropriate algorithms for determining layer height make it possible to carry out time domain reflectometric measurement of layer height within a tank in a way that is substantially insensitive to the dielectric constant and/or temperature of at least one layer and that is capable of resolving the heights of the various layers in which the TDR probe is immersed even when stratified layers having comparatively similar dielectric constants are present.

Figure 8:
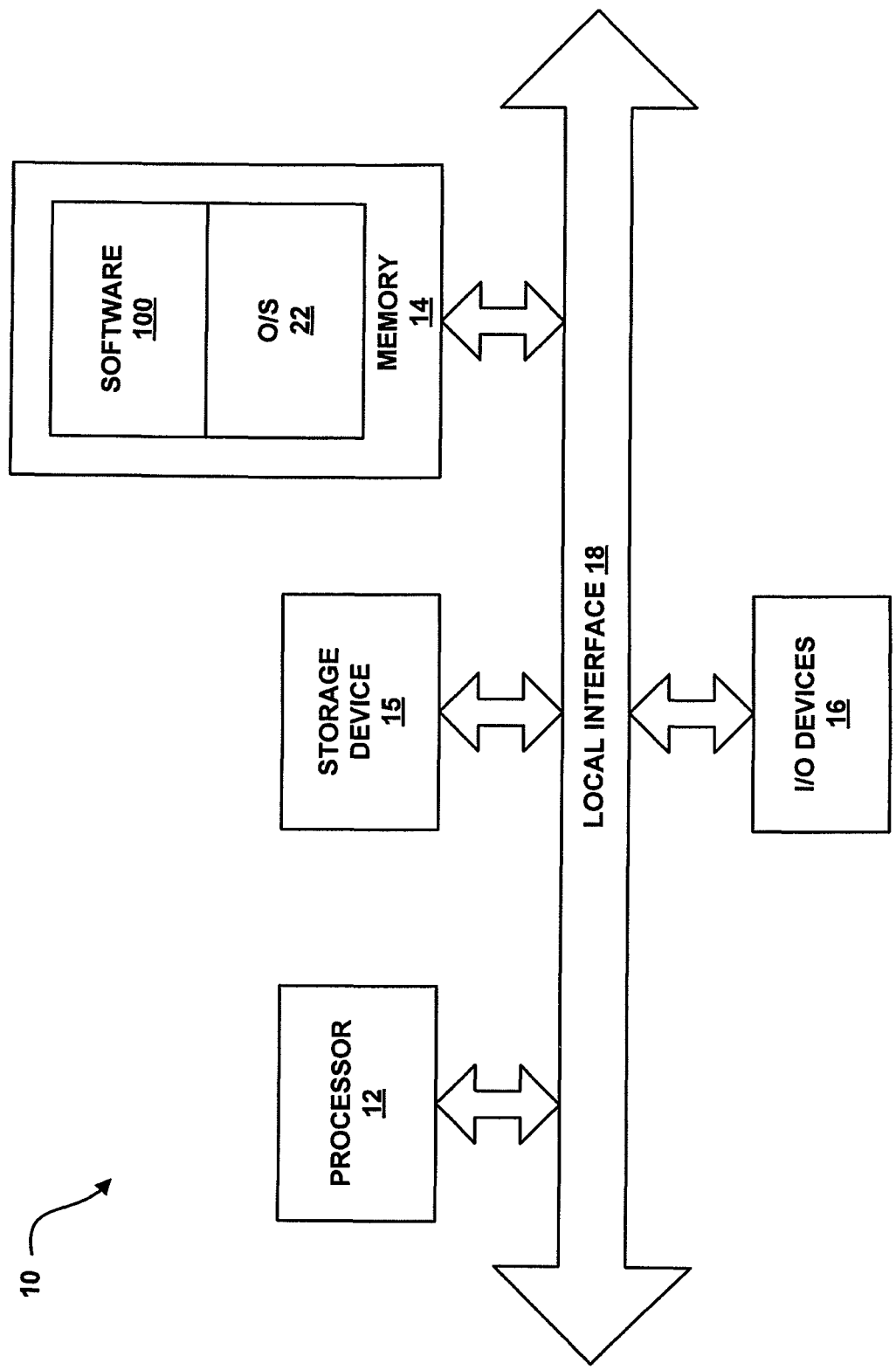
FIG. 8 is a schematic diagram showing an example of a general purpose computer and associated software for implementing a system and method for time domain reflectometric measurement of layer height within a tank in accordance with one aspect of the present invention.

An example of a general purpose computer that can implement the layer height measuring system of the present invention is shown in FIG. 8. In FIG. 8, the layer height measuring system is denoted by reference numeral 10. It should be noted that communication with the layer height measuring system may be provided by multiple means such as, but not limited to, the Internet. Further description with regard to use of the layer height measuring system via use of the Internet is provided below. Note that where the description below refers to a system for time domain reflectometric measurement of layer height within a tank in accordance with one aspect of the present invention, this description should be understood to apply as well to a method for time domain reflectometric measurement of layer height within a tank in accordance with another aspect of the present invention with modification as appropriate. The present system may be provided by a Web-based application. The following description assumes that the present system is provided by a Web-based application. It should be noted that the system may also be provided in an environment that is not Web-based.

The layer height measuring system of the invention can be implemented in software (e.g., firmware), hardware, or a combination thereof. In the currently contemplated best mode, the layer height measuring system is implemented in software, as an executable program, and is executed by a special or general purpose digital computer, such as a personal computer (PC; IBM-compatible, Apple-compatible, or otherwise), workstation, minicomputer, or mainframe computer. Specifically, the layer height measuring system, as provided by the computer, may be accessible via a Web site, through which parties using the layer height measuring system may interact. Further description of the layer height measuring system, and interaction therewith is provided below.

Generally, in terms of hardware architecture, as shown in FIG. 8, the computer 10 includes a processor 12, memory 14, storage device 15, and one or more input and/or output (I/O) devices 16 (or peripherals) that are communicatively coupled via a local interface 18. The local interface 18 can be, for example but not limited to, one or more buses or other wired or wireless connections, as is known in the art. The local interface 18 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 12 is a hardware device for executing software, particularly that stored in the memory 14. The processor 12 can be any custom made or commercially available processor, a central processing unit (CPU), an auxiliary processor among several processors associated with the computer 10, a semiconductor based microprocessor (in the form of a microchip or chip set), a macroprocessor, or generally any device for executing software instructions.

The memory 14 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 14 may incorporate electronic, magnetic, optical, and/or other types of storage media. Note that the memory 14 can have a distributed architecture, where various components are situated remote from one another, but can be accessed by the processor 12.

The software 100 in memory 14 may include one or more separate programs, each of which comprises an ordered listing of executable instructions for implementing logical functions of the layer height measuring system, as described below. In the example of FIG. 8, the software 100 in the memory 14 defines the layer height measuring system functionality in accordance with one embodiment of the present invention. In addition, the memory 14 may contain an operating system (O/S) 22. The operating system 22 essentially controls the execution of computer programs and provides scheduling, input-output control, file and data management, memory management, and communication control and related services.

Instructions for implementing the layer height measuring system 10 may be provided by a source program, executable program (object code), script, or any other entity comprising a set of instructions to be performed. When a source program, then the program needs to be translated via a compiler, assembler, interpreter, or the like, which may or may not be included within the memory 14, so as to operate properly in connection with the O/S 22. Furthermore, instructions for implementing the layer height measuring system 10 can be written as (a) an object oriented programming language, which has classes of data and methods, or (b) a procedure programming language, which has routines, subroutines, and/or functions.

The I/O devices 16 may include input devices, for example but not limited to, a keyboard, mouse, scanner, microphone, etc. Furthermore, the I/O devices 16 may also include output devices, for example but not limited to, a printer, display, etc. Finally, the I/O devices 16 may further include devices that communicate via both inputs and outputs, for instance but not limited to, a modulator/demodulator (modem; for accessing another device, system, or network), a radio frequency (RF) or other transceiver, a telephonic interface, a bridge, a router, etc.

When the layer height measuring system 10 is in operation, the processor 12 is configured to execute the software 100 stored within the memory 14, to communicate data to and from the memory 14, and to generally control operations of the computer 10 pursuant to the software 100. The layer height measuring system 10 and the O/S 22, in whole or in part, but typically the latter, are read by the processor 12, perhaps buffered within the processor 12, and then executed.

When the layer height measuring system 10 is implemented in software, as is shown in FIG. 8, it should be noted that instructions for implementing the layer height measuring system 10 can be stored on any computer-readable medium for use by or in connection with any computer-related system or method. Such a computer-readable medium may, in some embodiments, correspond to either or both the memory 14 or the storage device 15 shown in FIG. 8. Instructions for implementing the layer height measuring system 10 can be embodied in any computer-readable medium for use by or in connection with the processor 12 or other such instruction execution system, apparatus, or device. Although the processor 12 has been mentioned by way of example, such instruction execution system, apparatus, or device may, in some embodiments, be any computer-based system, processor-containing system, or other system that can fetch the instructions from the instruction execution system, apparatus, or device and execute the instructions.

In the context of this document, a "computer-readable medium" can be any means that can store, communicate, propagate, or transport the program for use by or in connection with the processor 12 or other such instruction execution system, apparatus, or device. Such a computer-readable medium may be, for example but not limited to, an electronic, magnetic, optical, electromagnetic, infrared, or semiconductor system, apparatus, device, or propagation medium, or other physical device or means that can contain or store a computer program for use by or in connection with a computer-related system or method. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the layer height measuring system 10 is implemented in hardware, the layer height measuring system 10 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 9:
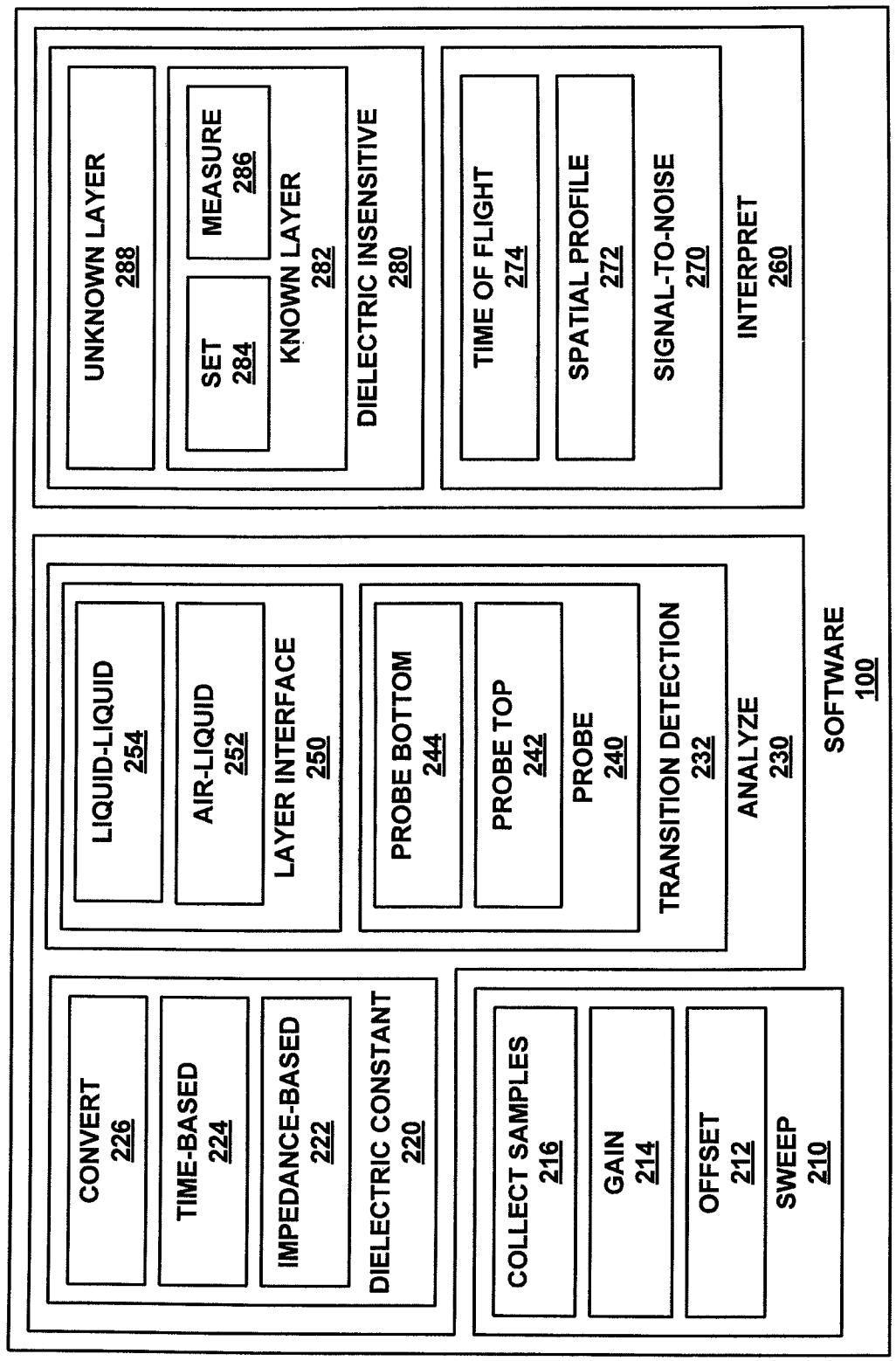
FIG. 9 is a schematic diagram showing functional blocks representing functionality defined by the software of FIG. 8.

Referring to FIG. 9, this is a schematic diagram showing functional blocks representing functionality defined by the software 100 of FIG. 8 when applied, for example, to the TDR device 105, 107 of the first or second exemplary embodiment of the invention described above with reference to FIGS. 1 through 7. In accordance with the layer height measuring system 10 of the present embodiment, the software 100 includes a sweep module 210, an analyze module 230, and an interpret module 260.

The sweep module 210 includes an offset module 212, a gain module 214, and a collect samples module 216. The offset module 212 has functionality for setting an optimized offset as described above with reference to FIG. 3. The gain module 214 has functionality for setting an optimized gain as described above with reference to FIG. 3. The collect samples module 216 has functionality for collecting samples at times during a sample collection sweep in accordance with the optimized offset and optimized gain respectively set by the offset module 212 and the gain module 214.

The analyze module 230 includes a transition detection module 232 and a dielectric constant module 220. The transition detection module 232 includes a probe module 240 and a layer interface module 250. The probe module 240 includes a probe top module 242 and a probe bottom module 244. The probe top module 242 has functionality for detecting the impedance transition at the probe top where the cable 120 transitions to the top layer portion of the TDR probe 110 as described above with reference to FIGS. 4 and 6. The probe bottom module 244 has functionality for detecting the impedance transition at the electrically open probe bottom as described above with reference to FIGS. 4 and 6.

The layer interface module 250 has functionality for detecting interfaces between pairs of layers in which the TDR probe 110 is immersed or partially immersed within the tank. As is clear from the impedance-versus-time traces shown in FIGS. 4 and 6, the impedance discontinuities that occur at the transitions corresponding to interfaces between layers provide a basis for any number of algorithms that may be written for detection of these transitions. These transitions will vary in strength (magnitude of the change in impedance) and other characteristics depending on the substances respectively present in the layers straddling each such transition. For example, the magnitude of the change in impedance will tend to be large when adjacent layers have dissimilar dielectric constants, and will tend to be small when adjacent layers have similar dielectric constants.

Although the air-liquid interface tends to be easy to detect because of the dissimilarity of the dielectric constant of air and that of many liquids, note that certain liquid-liquid combinations can produce a very sharp transition where the dielectric constants of the liquid layers straddling that liquid-liquid interface are sufficiently dissimilar. For example, with a TDR probe 110 of configuration as described above with reference to FIGS. 1 through 3, an air-to-hydrocarbon-fuel liquid-liquid transition might correspond to an 86-ohms-to-55-ohms impedance change, while a hydrocarbon-fuel-to-water liquid-liquid transition might correspond to a 55-ohms-to-10-ohms impedance change. In analyzing impedance-versus-time traces to detect layer interfaces, it is therefore preferred to exploit not only the size of the impedance change across the transition but also the absolute impedance levels to either side of the transition.

In the embodiment shown in FIG. 9, the layer interface module 250 includes an air-liquid module 252 and a liquid-liquid module 254. The air-liquid module 252 of the present embodiment is specifically intended for detection of an air-liquid interface in a situation where there is a layer of air over a layer of liquid, such as is the case in the examples shown at FIGS. 5 and 7. The liquid-liquid module 254 of the present embodiment is specifically intended for detection of one or more liquid-liquid interfaces, there being one such liquid-liquid interface in the example shown at FIG. 7. Although the present embodiment categorizes the layer interface detection that is carried out by the layer interface module 250 in terms of whether an interface is an air-liquid interface or whether it is a liquid-liquid interface, this is done for convenience in the present embodiment because the dielectric constant of air is widely accepted as being known and as having a value of 1.0. In the present embodiment, because the air layer is taken to have known dielectric constant, the layer interface module 250 of the transition detection module 232 has an air-liquid module 252 for detection of the air-liquid interface and a liquid-liquid module 254 for detection of one or more liquid-liquid interfaces. In a generalized version of the present embodiment in which the layer of known dielectric constant is a layer other than air, the air-liquid module 252 and the liquid-liquid module 254 might be replaced by a known-unknown layer module for detection of an interface between layers respectively having known and unknown dielectric constants, and an unknown-unknown layer module for detection of one or more interfaces between layers that both have unknown dielectric constants. That is, the air-liquid module 252 and the liquid-liquid module 254 in the example shown in FIG. 9 merely reflect one convenient categorization of the types of layer interface that may be detected by the layer interface module 250, and one of skill in the art will appreciate that there are a wide variety of other such ways to categorize transitions corresponding to layer interfaces depending on the layers expected to be present within the tank during operation.

The dielectric constant module 220 includes an impedance-based module 222, a time-based module 224, and a convert module 226.

The impedance-based module 222 has functionality for determining dielectric constant based on impedance as measured, for example, in the form of an impedance-versus-time trace obtained as a result of TDR as described above. As described above with reference to FIGS. 4 through 7, such an impedance-versus-time trace will in general have regions along the impedance axis (vertical or y-axis at FIGS. 4 and 6) that respectively correspond to the various regions along the transmission line including the TDR probe 110 and the layers contained therewithin. In one embodiment, the impedance-based module 222 determines the dielectric constant of a region based on the fact that the dielectric constant of the region is inversely correlated with the impedance of that region as plotted on an impedance-versus-time trace.

The time-based module 224 has functionality for determining dielectric constant based on time domain length as measured, for example, in the form of an impedance-versus-time trace obtained as a result of TDR as described above. As described above with reference FIGS. 4 through 7, such an impedance-versus-time trace will in general have regions along the time axis (horizontal or x-axis at FIGS. 4 and 6) that respectively correspond to the various regions along the transmission line including the TDR probe 110 and the layers contained therewithin. Furthermore, the dielectric constants of these various regions relate the time domain (perceived) lengths of these regions to the physical (space domain) lengths of these regions in accordance with the relationship $$d \propto \frac{t}{\sqrt{\varepsilon}}$$

where d=distance (space domain length), t=time (time domain length), and $\varepsilon$=dielectric constant. This relationship can be used to determine dielectric constant when physical (space domain) length is known. For example, when the tank is full of a liquid of known dielectric constant, this relationship can be used to determine dielectric constant based on layer height. In one embodiment, the time-based module 224 determines the dielectric constant of a region based on the fact that the foregoing relationship can be used to derive the dielectric constant of the region from the observed relationship between the known physical (space domain) length of the region and the measured time domain (perceived) length of the region (for example, as plotted on an impedance-versus-time trace).

The convert module 226 has functionality for using dielectric constant to convert time domain length to space domain length. That is, once the dielectric constants of one or more of the various regions have been determined through use of the impedance-based module 222 and/or the time-based module 224, for example, the relationship $$d \propto \frac{t}{\sqrt{\varepsilon}}$$

described above can be used to convert all or any portion of the (time domain) impedance-versus-time trace to space domain length (height) information. For example, the convert module 226 in one embodiment might allow scaling to be carried out based on dielectric constant as determined by the impedance-based module 222 and/or the time-based module 224, so that regions having dielectric constants other than that of air, with dielectric constant=1.0, are scaled so that their lengths appear as if those regions had been in air. This compensation for dielectric constant, and conversion of the dielectric-constant-dependent time domain trace to dielectric-constant-independent space domain length (height) information, is another way in which embodiments of the present invention can be said to reduce sensitivity to dielectric constant.

The interpret module 260 includes a signal-to-noise module 270 and a dielectric insensitive module 280. The signal-to-noise module 270 includes a spatial profile module 272 and a time of flight module 274.

The spatial profile module 272 has functionality for using the various modules of the transition detection module 232 to detect the probe top, the probe bottom, and various layer interfaces when these can be detected with good signal-to-noise ratio, and for using these to construct a layer height profile. For example, under the control of the spatial profile module 272, the sweep module 210 may be used to collect samples for generation of a trace as shown in FIGS. 4 and 6, various transitions within such a trace might be detected using the various modules of the transition detection module 232, and dielectric constants of the various layers might be measured and the time domain trace might be converted to a space domain trace using the various modules of the dielectric constant module 220, to produce a spatial profile of the heights of the various layers in which the TDR probe 110 is immersed within the tank.

The time of flight module 274 has functionality for using time of flight through a layer to determine height of that layer when signal-to-noise ratio is poor and it is not possible to resolve one or more layer interfaces. For example, when the tank is nearly empty and the air-liquid interface is near the tank bottom, the strong reflection from the probe bottom may swamp or overwhelm, and prevent detection of, the air-liquid interface. In such a situation, it may be possible to more accurately measure layer height based on the time of flight through that layer.

That is, taking as an example the situation shown in FIGS. 4 and 5, as the tank empties and the height L2 of the liquid layer having dielectric constant $\varepsilon 2$ decreases, a point is reached where the strong reflection from the probe bottom at the right side of the impedance-versus-time trace of FIG. 4 swamps and prevents detection of the air-liquid interface. At such times, even though it may not be possible to adequately resolve the air-liquid interface on the impedance-versus-time trace, it may nonetheless be possible to resolve the strong reflection from the probe bottom, and to determine liquid layer height by following the movement of (the reflection from) the probe bottom along the time axis of the impedance-versus-time trace as the tank empties. That is, the known dielectric constant $\varepsilon 2$ of the liquid layer may be used to determine the space domain height of that layer from the time domain height thereof. Note that the dielectric constant $\varepsilon 2$ of the liquid layer of height L2 in this example may have been known in advance, may have been measured directly by the impedance-based module 222 or the time-based module 224, or may be measured indirectly by process of elimination from the known probe length and measured height L1 of the air layer (described in more detail below in connection with the dielectric insensitive module 280). Note that when using the impedance-based module 222 or the time-based module 224 in this example to directly measure the dielectric constant $\varepsilon 2$ of the liquid layer and convert time domain length to space domain length, one approach that may be employed is to simply calibrate the impedance-versus-time trace by noting the location of the probe bottom on the trace when liquid height within the tank is at a number of known levels, and to ratiometrically determine liquid layer height based thereon. Such a technique has been described in detail at commonly assigned U.S. nonprovisional patent application Ser. No. 12/243,511 entitled "System and Method for Accurately Measuring Fluid Level in a Tank."

That is, the spatial profile module 272 and the time of flight module 274 differ in that, in detecting layer height, the spatial profile module 272 makes use of time domain lengths to interfaces at the top and the bottom of the layer, while the time of flight module 274 instead makes use of the time of flight through the layer as measured by the time domain length to the interface at the bottom of the layer. The spatial profile module 272 is preferably used when both interfaces are detectable with good signal-to-noise ratio, and the time of flight module 274 is preferably used when one or more of the interfaces is not detectable with good signal-to-noise ratio.

The dielectric insensitive module 280 includes a known layer module 282 and an unknown layer module 288. The known layer module 282 includes a set module 284 and a measure module 286.

The dielectric insensitive module 280 uses process of elimination to eliminate dielectric-constant-sensitivity for at least one layer. For example, if the probe length is known, and it is known that the top layer within the tank is air having dielectric constant=1.0, then by carrying out TDR as described above with reference to FIGS. 1 through 3 to obtain an impedance-versus-time trace as shown in FIG. 4 for a single-liquid layer height profile 710 as shown in FIG. 5, it will be possible to accurately determine the height L1 of the air layer from the impedance-versus-time trace, and to subtract this from the known probe length L to obtain the liquid layer height L2. Here, the known layer module 282 would allow the dielectric constant of the known layer (for example, air having dielectric constant=1.0) to be set using the set module 284 if known in advance, or would allow the dielectric constant of that layer to be measured and thus become known for purposes of this known-unknown layer distinction using the measure module 286. For example, the measure module 286 might employ the impedance-based module 222 or the time-based module 224 to measure dielectric constant from the impedance-versus-time trace. The unknown layer module 288 derives the height of the layer having unknown dielectric constant from the known probe length and the measured height of the layer having known dielectric constant. Inasmuch as this method does not depend on TDR measurement of the liquid layer in the example of FIGS. 4 and 5, this method can be said to be insensitive to the dielectric constant of that liquid layer.

This basic technique can be used in iterative fashion to successively identify and measure multiple layers by process of elimination. For example, in situations such as that shown in FIG. 7 where a multiple-liquid layer height profile 810 produces an impedance-versus-time trace as shown in FIG. 6, liquid layer height L2 might be initially obtained as described above. Thereafter, this liquid layer height L2 might be resolved into a sublayer of liquid A having height L2A and a sublayer of liquid B having height L2B. If, for example, liquid B is known to be water having dielectric constant $\in 2B=80$, this dielectric constant might be set for that known liquid B sublayer using the set module 284, scaling based on this known dielectric constant $\in 2B$ might be carried out using the convert module 226 to obtain a space domain length for the height L2B of the known liquid B sublayer, and the unknown layer module 288 might then derive the height L2A of the unknown liquid A sublayer from the previously determined liquid layer height L2 and the measured height L2B of the known liquid B sublayer.

Figure 10:
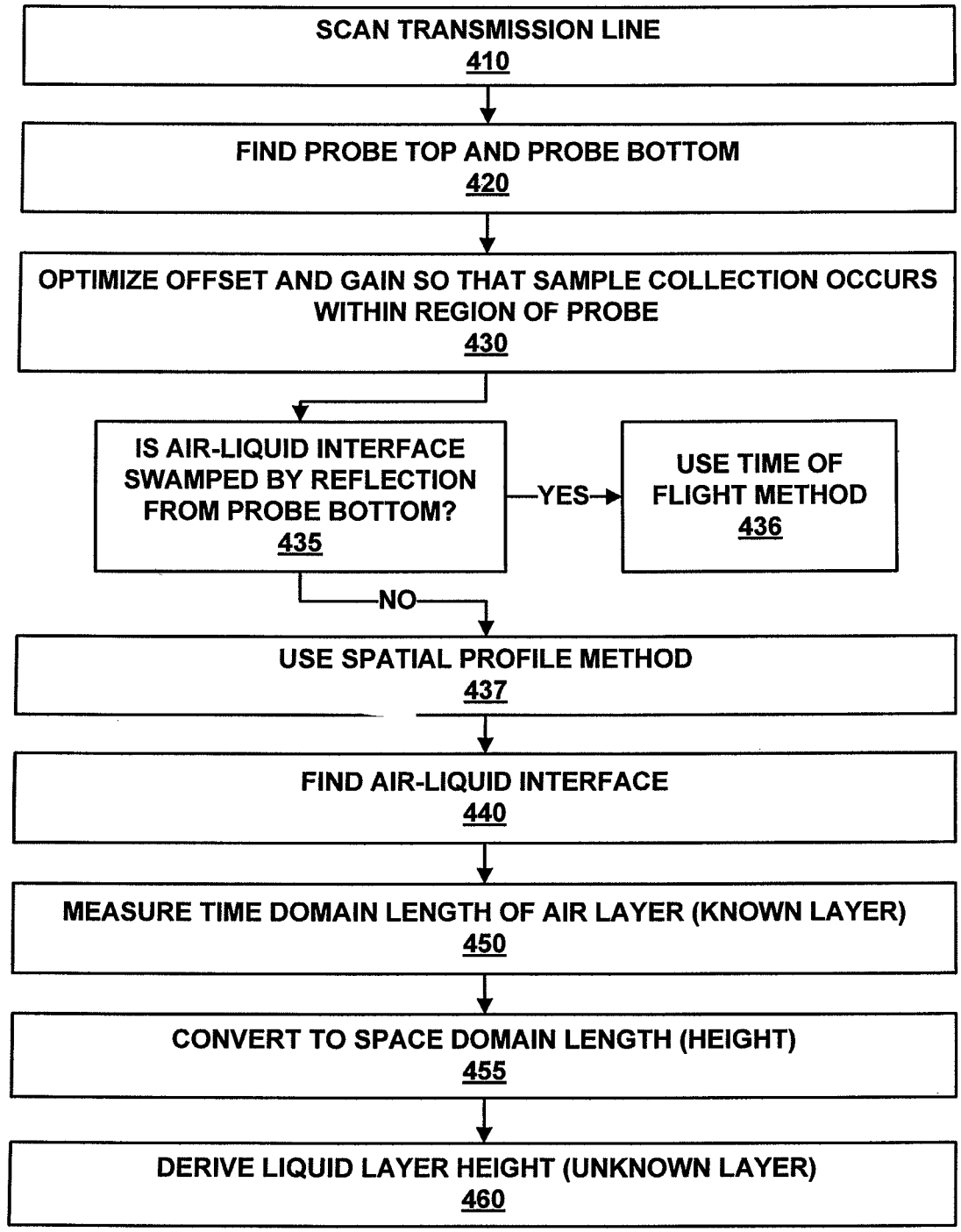
FIG. 10 is a flowchart illustrating a method for measuring layer height as described in specific terms based on the examples shown in FIGS. 4 through 7 in which there is an air-liquid interface and there may in addition be one or more liquid-liquid interfaces.

Referring to FIG. 10, this is a flowchart illustrating this method in further detail. The method in the flowchart of FIG. 10 is described in specific terms based on the examples in which there is an air-liquid interface and there may in addition be one or more liquid-liquid interfaces. For example, the method described with reference to the flowchart of FIG. 10 may be employed for dielectric-constant-insensitive measurement of liquid layer height in the context of the example shown in FIGS. 4 and 5 in which there is a single-liquid layer height profile 710, or in the context of FIGS. 6 and 7 in which there is a multiple-liquid layer height profile 810. For purposes of description of the present flowchart, it will be assumed at FIGS. 4 through 7 that the dielectric constant of the top layer is known and is here taken to be that of air, having dielectric constant $\in 1=1.0$.

At block 410, a transmission line containing a cable 120 and a TDR probe 110 as shown in FIG. 1 or FIG. 3 is scanned to obtain an impedance-versus-time trace as shown in FIG. 4 or FIG. 6, except that because sweep gain and offset have not yet been optimized, the trace obtained is not bounded to any particular region and will in general extend well beyond the probe top and the probe bottom.

At block 420, the probe top module 242 and the probe bottom module 244 respectively employ appropriate algorithms to detect and identify the transitions corresponding to the probe top and the probe bottom on the unbounded impedance-versus-time trace.

At block 430, the offset module 212 and the gain module 214 respectively carry out optimization of sweep offset and gain so that sample collection by the collect samples module 216 occurs substantially within the region bounded by the probe top and the probe bottom, as described above with reference to FIG. 3. At this time, samples are collected by the collect samples module 216 and an impedance-versus-time trace for the region bounded by the probe top and the probe bottom is generated as shown in FIG. 4 or FIG. 6.

At block 435, the signal-to-noise module 270 employs an appropriate algorithm to determine whether (the reflection from) the air-liquid interface is swamped by (the strong reflection from) the probe bottom. For example, in one embodiment, it might be determined that the air-liquid interface is swamped by the probe bottom if the air-liquid module 252 fails to find an impedance transition sufficiently similar to that expected for the air-liquid interface. In another embodiment, the air-liquid interface might be tracked as liquid within the tank is consumed, and it might be determined that the air-liquid interface is swamped by the probe bottom when the air-liquid interface reaches a height of, for example, on the order of 0.4 inch or 0.5 inch from the probe bottom. In yet another embodiment, the signal-to-noise ratio might be determined to be good and the spatial profile module 272 might be employed for detection when the impedance transition corresponding to the interface being detected (here, the air-liquid interface) is more than approximately 0.6 inch from the probe bottom, and the signal-to-noise ratio might be determined to be poor and the time of flight module 274 might be employed for detection when the impedance transition is within approximately 0.6 inch of the probe bottom (as detected or as inferred based on extrapolation from the previous movement of that interface). In still yet another embodiment, the signal-to-noise ratio might be determined to be good and the spatial profile module 272 might be employed for detection when the impedance transition corresponding to the interface being detected (here, the air-liquid interface) is more than approximately 0.3 inch from the probe bottom, and the signal-to-noise ratio might be determined to be poor and the time of flight module 274 might be employed for detection when the impedance transition is within approximately 0.3 inch of the probe bottom (as detected or as inferred based on extrapolation from the previous movement of that interface).

If it is determined at block 435 that the air-liquid interface is swamped by the probe bottom, then processing proceeds to block 436, where the time of flight method is used to determine liquid layer height as described above in connection with the time of flight module 274. If it is determined at block 435 that the air-liquid interface is not swamped by the probe bottom, then processing proceeds to block 437, where the spatial profile method is used to determine liquid layer height as described below.

At block 440, the air-liquid module 252 employs an appropriate algorithm to detect and identify the transition corresponding to the air-liquid interface on the bounded impedance-versus-time trace obtained at block 430.

At block 450, the time domain length corresponding to the height L1 (see FIG. 5) of the air layer is measured based on the location of the probe top detected at block 420 and the location of the air-liquid interface detected at block 440 on the bounded impedance-versus-time trace obtained at block 430.

At block 455, the time domain length corresponding to the air layer height L1 measured at block 450 is converted to a space domain length (height) L1 by the convert module 226 based on the known dielectric constant of the air layer as set at the set module 284 or as measured at the measure module 286. Because it has been assumed for purposes of the present description that the top layer is air having dielectric constant $\in 1=1.0$, it so happens in the present case that no conversion using the dielectric constant module 220 need be carried out, and the known layer module 282 can simply use the time domain length of the air layer to obtain the (space domain) height L1 of the air layer by simple comparison or ratiometric calibration relative to the known probe length L corresponding to the distance between the probe top and the probe bottom on that trace (see FIG. 4).

At block 460, the unknown layer module 288 derives the height L2 of the liquid layer by subtracting the space domain height L1 of the air layer as determined at block 455 from the known length L of the TDR probe 110.

Inasmuch as the foregoing method did not employ TDR to directly measure the height L2 of the liquid layer but instead derived the height L2 of the liquid layer from the known probe length L and the measured height L1 of the air layer, this method can be said to be insensitive to the dielectric constant $\in 2$ of the liquid layer.

If the profile of the tank is known, this will make it possible to determine liquid layer volume from the height L2 of the liquid layer.

Since the height L2 of the liquid layer is now known, this information can be used to indirectly determine dielectric constant. That is, dielectric constant of a layer can be directly determined from an impedance-versus-time trace using the impedance-based module 222 or the time-based module 224 as described above, or can be indirectly determined if the height of the layer is known by using the same relationship as described above in connection with the time-based module 224, except that the relationship would be rearranged as $$\sqrt{\varepsilon} \propto \frac{t}{d}$$

to allow the dielectric constant to be derived from the ratio of the time domain length to the space domain length (comparison with air or another layer of known dielectric constant permitting calibration to transform the proportionality into an equality giving the absolute rather than the relative magnitude of the dielectric constant).

Once the dielectric constant of the layer is known, this information can be used to confirm that the liquid is what it is expected to be (for prevention of misfueling) or to determine temperature from known data relating dielectric constant to temperature.

Once temperature is known, this information can be used to determine mass of the liquid layer based on known data relating volume to temperature.

As described above, the method of FIG. 10 uses the known probe length L and the measured height L1 of an air layer of known dielectric constant $\in 1$ to derive the height L2 of a liquid layer of unknown dielectric constant $\in 2$ as shown in FIG. 5 or FIG. 7.

Where the tank contains a multiple-liquid layer height profile 810 as shown in FIG. 7, a similar procedure may thereafter be used to determine the respective heights of any stratified immiscible liquid sublayers. That is, referring to FIG. 7, once the liquid layer height L2 has been determined in accordance with the procedure of FIG. 10, a similar procedure as at block 440 might be employed, except that it would be the liquid-liquid interface between liquid A and liquid B rather than the air-liquid interface that would be found. Whereas the air layer was taken to be the known layer and the liquid layer was taken to be the unknown layer at the example in the flowchart of FIG. 10, in the present case one of the liquid sublayers would be taken to be the known layer and the other liquid sublayer would be taken to be the unknown layer. That is, the dielectric constant of the sublayer that is taken to be the known layer may be set at the set module 284 if known in advance or may be measured by the impedance-based module 222 or the time-based module 224 under the control of the measure module 286. For purposes of the present description it will be assumed that the dielectric constant $\in 2B$ of the bottommost sublayer (liquid B) has been set or measured in this fashion. The liquid B sublayer thus becomes the known layer, and the liquid A sublayer becomes the unknown layer.

Thereafter, a procedure similar to that described with reference to block 450 might be employed, except that it would be the time domain length of the liquid B sublayer that would be measured. In a procedure similar to that at block 455, the convert module 226 would then use the dielectric constant $\in 2B$ of the liquid B sublayer to convert the time domain length (height) of the liquid B sublayer to a (space domain) height L2B for the liquid B sublayer. In a procedure similar to that at block 460, the unknown layer module 288 would then derive the height L2A of the liquid A sublayer from the known liquid layer height L2 and the measured height L2B of the liquid B sublayer.

At this time, because TDR was not employed to directly measure the height L2A of the liquid A sublayer but the height L2A of the liquid A sublayer was instead derived from the known liquid layer height L2 and the measured height L2B of the liquid B sublayer, this method can be said to be insensitive to the dielectric constant $\in 2A$ of the liquid A sublayer.

Where there are more than two stratified liquid sublayers, this process can be repeated in iterative fashion to successively measure any number of sublayers.

In one variation, to achieve even greater spatial resolution, sweep offset and gain may be optimized not only for collection of samples substantially within the region bounded by the probe top and the probe bottom as described above with reference to FIG. 3, but such optimization of sweep offset and gain may progressively target narrower subregions with each successive iteration as will be described below.

Figure 11:
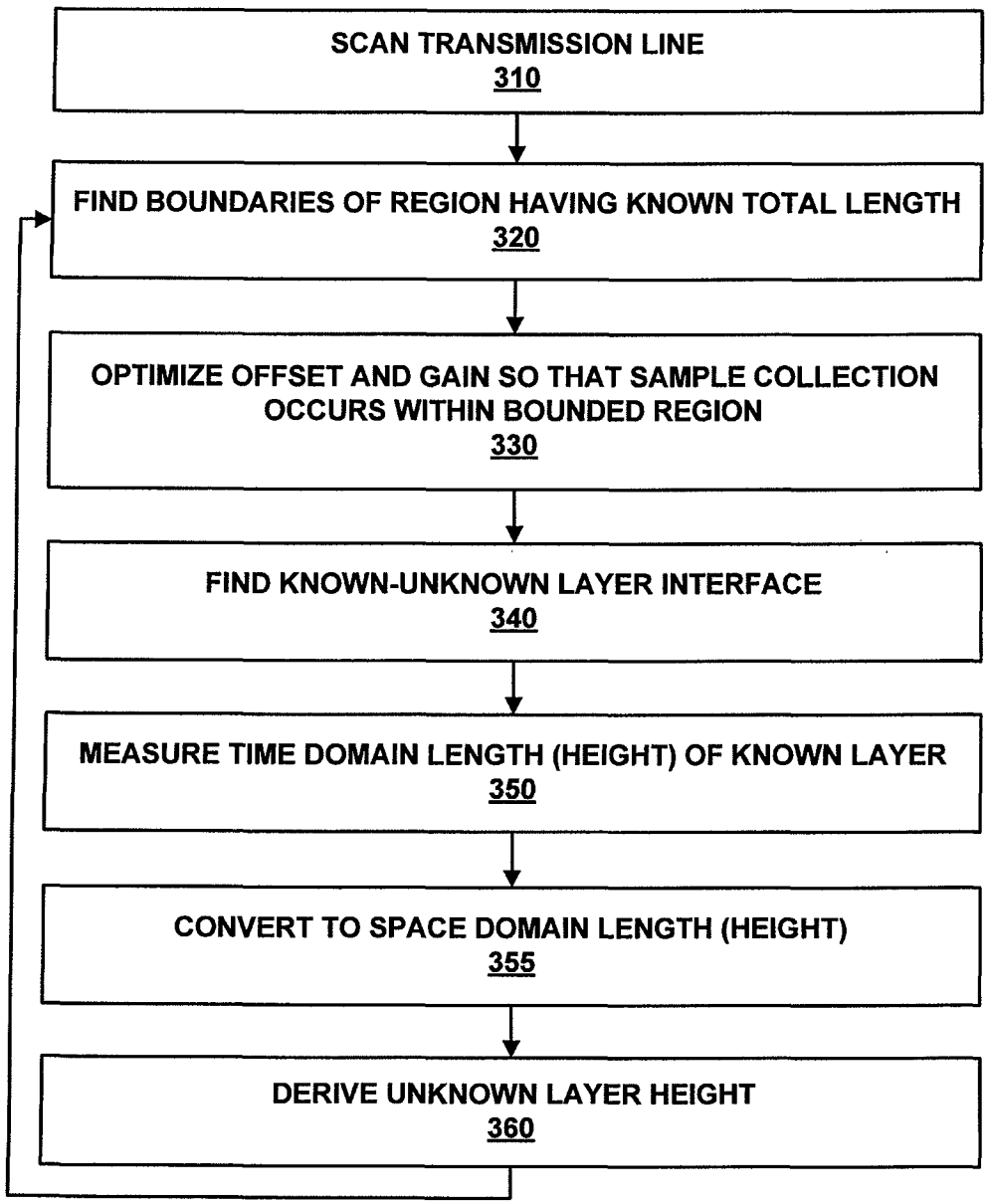
FIG. 11 is a flowchart illustrating a method for measuring layer height as described in more general terms based on an example in which there are one or more known-unknown layer interfaces.

Referring to FIG. 11, this is a flowchart illustrating this method in further detail. The method in the flowchart of FIG. 11 is described in more general terms based on an example in which there are one or more known-unknown layer interfaces. The method described with reference to the flowchart of FIG. 11 may, for example, be employed for dielectric-constant-insensitive measurement of layer height in the context of the example shown in FIGS. 6 and 7 in which there is a multiple-liquid layer height profile 810.

At block 310, a transmission line containing a cable 120 and a TDR probe 110 as shown in FIG. 1 or FIG. 3 is scanned to obtain an impedance-versus-time trace as shown in FIG. 6, except that because sweep gain and offset have not yet been optimized, the trace obtained is not bounded to any particular region and will in general extend well beyond the probe top and the probe bottom.

At block 320, the transition detection module 232 detects impedance transitions representing boundaries of a region having a known total length and containing at least two subregions. For example, on a first pass through the loop that begins with block 320, the transitions corresponding to the probe top and the probe bottom might be detected. The impedance transitions represented by the probe top and the probe bottom bound the region of the TDR probe 110, which has known total length L. Furthermore, the region bounded by the probe top and the probe bottom contains at least two subregions, these being, for example, a subregion of length L1 and a subregion of length L2 as shown in FIG. 7.

At block 330, the offset module 212 and the gain module 214 respectively carry out optimization of sweep offset and gain so that sample collection by the collect samples module 216 occurs substantially within the region bounded by the impedance transitions detected at block 320. Once sweep offset and gain have been optimized to match the region, samples may be collected by the collect samples module 216 and an impedance-versus-time trace for the region may be generated as shown in FIG. 6.

At block 340, the transition detection module 232 detects an impedance transition representing an interface between a layer having known dielectric constant and a layer having unknown dielectric constant. Although the dielectric constant of any layer might in theory be measured by the impedance-based module 222 or the time-based module 224, for example, the categorization of layers into known and unknown here does not necessarily imply any particular degree of certainty or accuracy with which the dielectric constant of any particular layer may be known or not known, but rather is for the purpose of defining which layer it will be whose height is measured by TDR (known layer), and which layer it will be whose height is determined by process of elimination and is thus insensitive to dielectric constant (unknown layer). For example, on the first pass through the loop that begins with block 320, it might be an air-liquid interface that is detected at block 340, this air-liquid interface representing the transition between an air layer of known dielectric constant and a liquid layer of unknown dielectric constant. Here, the reason that the air layer might preferably be taken to be the known layer is that the dielectric constant of air is generally assumed to be known and to be 1.0.

Although not shown in the flowchart of FIG. 11, there is no particular objection to employment here as well of functionality similar to that indicated at blocks 435 through 437 in the flowchart of FIG. 10 for causing detection to occur by the time of flight method in the event that the interface is swamped by a strong reflection from a nearby impedance transition.

At block 350, the time domain length (height) of the known layer is obtained by analyzing the impedance-versus-time trace.

At block 355, the time domain length (height) obtained at block 350 for the known layer is scaled using the convert module 226 based on the known dielectric constant of that layer, as set at the set module 284 if known in advance or as measured by the impedance-based module 222 or the time-based module 224 under the control of the measure module 286, to obtain a space domain length (height) for the known layer.

At block 360, the unknown layer module 288 derives the height of the unknown layer by subtracting the space domain height of the known layer as determined at block 355 from the known total length of the region bounded by the impedance transitions detected at block 320. In the event that the region having known total length that was detected at block 320 contains three or more subregions, it is a minor variation on the foregoing to set or measure dielectric constant for as many known subregions as necessary at block 355 so that there is exactly one remaining unknown subregion for which dielectric constant need not be measured directly but is rather determined indirectly by process of elimination. Inasmuch as TDR is not employed to directly measure the height of the unknown subregion but the height of the unknown subregion is instead derived from the known height of the region and the measured height(s) of the known subregion(s), this method can be said to be insensitive to the dielectric constant of the unknown subregion.

Thereafter, processing may return to block 320 and the loop may be repeated as many times as necessary to determine heights of as many layers and/or sublayers as can be resolved. Typically it will be the unknown layer whose height has been determined at block 360 during one pass through the loop that becomes the region having known total length and containing at least two subregions at block 320 of the next pass through the loop.

Thus, referring to FIG. 7, during a first pass through the loop, sweep offset and gain might be optimized for collection of samples within the region of the TDR probe 110 of known length L at block 330, an air-liquid interface representing the transition between an air layer of height L1 and a liquid layer of height L2 might be detected at block 340, the air layer of height L1 might be taken to be the subregion of known dielectric constant and the liquid layer of height L2 might be taken to be the subregion of unknown dielectric constant, with the time domain height of the air layer being measured by TDR at block 350 and converted to a space domain height L1 for the air layer at block 355, which is then subtracted from the known length L of the TDR probe 110 to derive the height L2 of the liquid layer at block 360.

On a subsequent pass through the loop, sweep offset and gain might be optimized for collection of samples within the region of the liquid layer of known length L2 at block 330, a liquid-liquid interface representing the transition between a liquid A layer of height L2A and a liquid B layer of height L2B might be detected at block 340, the liquid A layer of height L2A might be taken to be the subregion of known dielectric constant and the liquid B layer of height L2B might be taken to be the subregion of unknown dielectric constant, with the time domain height of the liquid A layer being measured by TDR at block 350 and converted to a space domain height L2A for the liquid A layer at block 355, which is then subtracted from the known length L2 of the liquid layer to derive the height L2B of the liquid B layer at block 360. This process can be repeated in iterative fashion to successively measure any number of sublayers.

With regard to the order in which layers are taken up for resolution into sublayers by iterative use of the loop in the flowchart of FIG. 11 (or the corresponding portion of the flowchart in FIG. 10), there is no particular preferred order, but note that it will generally be advantageous to select for the known layer a region having well-defined and uniform dielectric constant, and to reserve for the unknown layer a region having poorly defined or nonuniform dielectric constant. For example, where the top layer is known to be air, because an air layer will typically have comparatively well-defined and uniform dielectric constant, it may be preferred to use the air layer as the known layer on the first pass through the loop. In contrast, especially where there is a liquid layer that may have poorly defined or nonuniform dielectric constant due to phenomena such as aging, contamination, mixture, or stratification, it may be preferred to use the liquid layer as the unknown layer on the first pass through the loop. Where stratified sublayers are present within the liquid layer, these may be resolved (the heights thereof may be measured) during subsequent passes through the loop. As with the air layer and the liquid layer during the first pass through the loop, it will generally be advantageous during any subsequent passes through the loop that sublayer(s) having well-defined and uniform dielectric constant be employed as the known layer(s) and that a sublayer having poorly defined or nonuniform dielectric constant be employed as the unknown layer. Where the dielectric constants of all layers/sublayers are sufficiently well-defined and uniform, one strategy that might be employed is to work from the probe top to the probe bottom detecting layers and any sublayers, until the strong reflection from the probe bottom dominates and prevents further resolution into sublayers (which might occur, for example, at a point approximately 0.5 inch from the probe bottom).

Note that during each successive pass through the loop that begins with block 320 in the flowchart of FIG. 11, sweep gain and offset are reoptimized to match the new region so as to achieve improved spatial resolution of detection within that region. Thus, processing capacity can be advantageously applied to progressively smaller regions as layers are resolved into their component layers. Of course, there is no objection to not reoptimizing sweep gain and offset each successive pass through the loop but instead keeping sweep gain and offset as previously optimized during a previous pass through the loop. Furthermore, in some embodiments (for example, where the length of the cable 120 is short, or where digital signal processing can be carried out by the electronics unit 130 with ample processing capacity and response time), this dielectric-constant-insensitive determination of layer height might be advantageously carried out without the need to optimize sweep gain and/or offset at all.

In another variation, this process of elimination and derivation of unknown layers from known layers may be used in conjunction with the closed-loop scan-lock-track methodology disclosed in commonly assigned U.S. nonprovisional patent application Ser. No. 11/650,841 entitled "Scan Lock and Track Fluid Characterization and Level Sensor Apparatus and Method."

That is, following scanning and identification of the probe top and probe bottom by the probe module 240 as described above with reference to block 320 of FIG. 11, the probe top and the probe bottom might be locked onto and tracked in closed-loop fashion, at which time sweep offset and gain would be optimized so that collection of samples substantially occurs within the region bounded by the probe top and the probe bottom, as described above with reference to block 330 of FIG. 11. Thereafter, following detection of a known-unknown layer interface within that region, measurement of the known layer height, and derivation of the unknown layer height as described above with reference to blocks 340 through 360 of FIG. 11, the boundaries of the unknown layer might be locked onto and tracked in closed-loop fashion in a subsequent pass through the loop beginning with block 320, at which time sweep offset and gain would be reoptimized so that collection of samples substantially occurs within the unknown layer region. Where the unknown layer contains multiple stratified sublayers, the foregoing process might be repeated in iterative fashion as many times as necessary until all layers and sublayers have been resolved. With each successive pass through the loop that begins with block 320 in the flowchart of FIG. 11 (or the corresponding portion of the flowchart in FIG. 10), not only would sweep offset and gain be reoptimized as indicated at block 330 of FIG. 11, but the boundaries of the region identified at block 320 would be locked onto and tracked in closed-loop fashion.

Above, several representative embodiments of the present invention have been described with reference to the drawings. One of skill in the art will readily appreciate that a great many variations are possible.

For example, misfueling may be detected by measuring the dielectric constant of a layer and comparing the measured value to the expected dielectric constant for that layer. Contamination, deterioration in quality, and other chemical changes may be detected in similar fashion where such changes are accompanied by change in dielectric constant. Similar techniques may be used to identify layer content and measure layer height when stratified layers of immiscible liquids are present within a tank, such as when seawater is intentionally used as ballast in oil tankers or when groundwater seeps into tanks for fuel pumps at filling stations. At such times, dielectric constants of respective layers may be known in advance, or may be measured either directly from an impedance-versus-time trace using the impedance-based module 222 or the time-based module 224, or indirectly by first using the dielectric insensitive module 280 to determine the heights of one or more known layers and to then derive the height of an unknown layer from the known length of the probe and the heights of one or more known layers by process of elimination. When using the dielectric insensitive module 280 for indirect measurement of the dielectric constant of a layer, this indirectly derived height might be used to determine dielectric constant of the layer by using the same relationship as described above in connection with the time-based module 224, except that in the present case the relationship would be rearranged as $$\sqrt{\varepsilon} \propto \frac{t}{d}$$

to allow the dielectric constant to be derived from the ratio of the time domain length to the space domain length (comparison with air or another layer of known dielectric constant would permit calibration for going from the proportionality relationship to an equality relationship that would give an absolute magnitude for dielectric constant).

Furthermore, although spacing of the vertical tick marks within the "Rx samples" envelope shown beneath the TDR probes 110 in FIG. 3 might suggest that samples are collected at equal time intervals, the present invention is not limited thereto. That is, although there is no particular objection to collecting samples at uniform time intervals, samples need not be collected at uniform time intervals. Especially where dielectric constants of layers within the tank are very different, collection of samples at equal time intervals may give disproportionately high weight to high-dielectric-constant layers since the perceived lengths of these will be spread out more than for low-dielectric-constant layers. Instead, to make best use of the limited number of samples than can be collected in one cycle, it may be desirable to adjust the sample collection interval for dielectric constant so as to obtain a more or less uniform sample density per (space domain) length.

Moreover, although it is the leading edge of a positive-going interrogation pulse that is used for detection in the example shown in FIG. 3, note that the interrogation pulse employed for detection may in general be positive-going or negative-going, and it may be the leading edge or the trailing edge thereof that is employed for detection. One of skill in the art will readily understand how to modify the description presented herein for application to such variations.

Although the TDR probe 110 in the above embodiments has been described as being electrically open at its bottom, there is no particular objection to employment of a probe that is electrically closed due to the inner conductor 112 and the outer conductor 114 thereof having been shorted together at the probe bottom. Note, moreover, that the present invention is not limited to coaxial probes. For example, there is no particular objection to employment of one or more single-conductor probes.

Furthermore, although the present invention has been described in terms of examples in which a TDR probe is oriented approximately vertically within a tank such that the probe top is near the top of the tank and the probe bottom is near the bottom of the tank, note that there is no particular objection to employment of an upside-down TDR probe that is oriented approximately vertically within the tank but in which the probe top (point closest to the cable and thus to the electronics unit) is near the bottom of the tank, and the probe bottom (point farthest from the cable and thus from the electronics unit) is near the top of the tank. One of skill in the art will readily understand how to modify the description presented herein for application to such a TDR probe oriented upside-down relative to that which has been described above. Note that although there is no particular objection to employment to a single-conductor probe or other such noncoaxial probe, if such an upside-down coaxial probe is to be employed it may be desired to create perforations or similar passages in the outer conductor so as to allow free exchange of fluid thereacross.

The above description makes mention of a cable 120 and provides examples of dimensions as well as frequencies of signals that might propagate along such a cable 120. However, as explained above, the term "cable" is not used in a limiting sense but only as shorthand for an appropriate wire, waveguide, or other such length of transmission line for connecting an electronics unit to a probe. Except where otherwise clear from context, the present invention should not be construed as being limited with respect to any particular signal frequency range or configuration of electronics, transmission line, or probe.

Although in the description given above with reference to FIG. 3 it has been suggested that it is the reflections, from various impedance discontinuities, of the leading edge of the interrogation pulse that are captured during sample collection, note that in some embodiments reflections of the trailing edge of the interrogation pulse may alternatively or in addition be captured during sample collection.

Although portions of the description given above in connection with the dielectric insensitive module 280 refer to dielectric-constant-insensitive determination of an unknown layer height by process of elimination from known probe length and one or more known layer heights, note that such a process of elimination need not necessarily be employed, and there is no particular objection to determining dielectric constant for all layers not by process of elimination but as a result of having known the dielectric constant in advance or as a result of having used the impedance-based module 222 or the time-based module 224 to measure dielectric constant. That is, there is no particular objection to an embodiment in which no layers are "unknown," meaning that the unknown layer module 288 is not used to determine the height of any layer by process of elimination, but rather all layers are "known," meaning that the dielectric constants of all layers are either set at the set module 284 or measured by the impedance-based module 222 or the time-based module 224 under the control of the measure module 286.

Although in the description given above it has been convenient to refer to impedance-versus-time traces such as those shown in FIGS. 4 and 6, note that there is no particular requirement that such traces actually be created or displayed. That is, it may be sufficient in some embodiments that the samples collected by the collect samples module 216 are capable of being analyzed to provide information as appropriate for the various modules of the analyze module 230 and the interpret module 260 to carry out their respective functionalities. Thus, except where otherwise clear from context, where mention has been made of impedance-versus-time traces, this should be understood not to require that such traces literally be created and displayed, but only that information extracted by analysis from the samples collected by the collect samples module 216 be made available to other modules as necessary or appropriate in light of the functionalities of those other modules. For example, depending on the algorithm employed by the transition detection module 232 for detection of impedance transitions, it may in some embodiments be sufficient to extract information about the slope of such a trace and pass this information to the transition detection module 232, without the need to actually create and display such an impedance-versus-time trace. Likewise, information about impedance level could be extracted from collected samples and passed to the impedance-based module 222 of the dielectric constant module 220. Thus, information extracted by analysis of the collected samples may in general be made available to the various modules of the software 100 without the need to create or display impedance-versus-time traces.

Note that the term "impedance" has been employed in describing impedance-versus-time traces such as those shown in FIGS. 4 and 6, in describing the impedance-based module 222, and in describing various other aspects of embodiments of the present invention. However, it should be understood that the term "impedance" as used herein has been employed for convenience of description, impedance being merely one representative electrical characteristic correlatable to dielectric constant. As explained at the description given with reference to FIGS. 4 and 6, the vertical axes of the traces in those drawings are not necessarily to scale but are labeled to indicate generally that it may be impedance or dielectric constant that is measured, and one of skill in the art will of course understand from this that any of a wide variety of other electrical characteristics including voltage and current, to name two more examples, may be correlated to dielectric constant depending on the circuitry employed. Where the description given above and the claims attached hereto make reference to "impedance," this should therefore not be interpreted narrowly as limiting the present invention to direct measurement of impedance per se, but should be understood to imply, as possible alternatives, measurement of any of a wide variety of electrical characteristics correlatable to impedance and thus capable of being considered as constituting indirect measurement of impedance (and thus of dielectric constant).

Although description has been given above of several exemplary embodiments of systems and methods for determining liquid height within a tank, and mention has specifically been made of various liquids and various kinds of tank, note that the present invention may be applied to measurement of heights of a wide variety of liquids within a wide variety of tanks. The present invention should not be construed as being limited to any particular type of liquid or any particular type of tank. Moreover, inasmuch as measurement of liquid height may involve measurement of one or more nonliquid layers such as air or other such gas also present within the tank, characterization of embodiments of the present invention as being for measurement of liquid height should not be interpreted as excluding the possibility that one or more nonliquid layers may also be measured.

Systems and methods for determining liquid height within a tank in accordance with various aspects and embodiments of the present invention solve one or more of the problems mentioned above, and may also provide other advantages and benefits.

As described above, by optimizing sample collection sweep delay and aliasing in correspondence to the (time domain) distance to and (time domain) length of a TDR probe, or in correspondence to the (time domain) distance to and (time domain) length of one or more layers in which that probe is immersed, one or more embodiments of the present invention permit more efficient use of processing electronics, reduced sensitivity to temperature and dielectric constant, reduced response time, and/or improved resolution in detecting the heights of the various layers in which the TDR probe is immersed. Ability to optimize sample collection for the cable-probe system in this way is especially effective when processing electronics are remotely located relative to the TDR probe or when a single electronics unit is used with multiple cable-probe-tank systems.

Furthermore, embodiments of the present invention permit improved spatial resolution and ability to detect impedance transitions not just between layers of comparatively dissimilar dielectric constant such as air and water, but also between layers of comparatively similar dielectric constant such as air and fuel, and even between layers of stratified liquids. By improving the spatial resolution with which the heights of the various layers in which the TDR probe is immersed can be detected, one or more embodiments of the present invention permit detection not only of an interface between layers of substances of comparatively dissimilar dielectric constant, such as an air-liquid interface at the surface of a liquid within a tank, but also permit detection of interfaces between layers of substances of comparatively similar dielectric constant, such as liquid-liquid interface(s) between stratified layers of immiscible liquids within the tank. Ability to resolve stratified layers of immiscible liquids within the tank can be especially advantageous when it is desired to know the true amount of fuel, for example, that remains in a tank when water is mixed with the fuel intentionally, such as when seawater is used as ballast in oil tankers; or unintentionally, such as when water is present in a vehicle fuel tank or such as when groundwater seeps into tanks for fuel pumps at filling stations.

Moreover, embodiments of the present invention permit dielectric-constant-insensitive measurement of liquid layer height. Various embodiments of the present invention achieve dielectric constant insensitivity in various ways. For example, by employing a sweep offset that substantially eliminates sample collection within the region corresponding to the cable or other such transmission line medium between the TDR probe and the electronics, some embodiments of the present invention substantially eliminate the effect of the dielectric constant of the cable on measurement of layer height. Another way that some embodiments reduce sensitivity to dielectric constant is by compensating for dielectric constant by measuring the dielectric constant of a layer based on the detected impedance of that layer or the time of flight of the interrogation pulse through that layer and using the measured dielectric constant to convert time domain layer height to space domain layer height. Another way that some embodiments reduce sensitivity to dielectric constant is by using process of elimination to determine height of at least one layer of unknown dielectric constant from a known probe length and a height of at least one layer of known dielectric constant.

Such reduced sensitivity to dielectric constant is especially beneficial when ethanol or similar additive is added to hydrocarbon fuel, since unlike many contaminants such as water, such additives are frequently miscible with the fuels to which they are added and have large effect on the dielectric constants of those fuels. In addition, inasmuch as dielectric constant is generally a function of temperature, reduction in sensitivity to dielectric constant effectively means that there is reduced sensitivity to temperature. Reduced sensitivity to temperature can be especially useful when it is desirable to know the mass rather than the volume of liquid remaining in a tank. For example, when estimating distance that can be traveled before running out of fuel, it is generally more helpful to know the mass rather than the volume of the fuel remaining in the fuel tank.

Moreover, intelligent functionality in accordance with various embodiments of the present invention help to further improve resolution, reduce sensitivity to dielectric constant, or otherwise improve performance or efficiency. For example, by progressively optimizing sweep delay and aliasing so that sample collection is targeted on an increasingly narrow portion of the TDR probe as the layers in which the TDR probe is immersed are successively measured by an iterative process of elimination, it is possible to achieve improved resolution with which those layers are measured. In addition, by carrying out such progressive optimization of sweep delay and aliasing in conjunction with closed-loop scan-lock-track methodology, it is possible to improve accuracy and reduce response time. As another example, by selectively employing a time-of-flight based method as an alternative to the spatial profile method in cases where the strong reflection from an impedance transition such as that from the probe bottom would swamp detection of an air-liquid or liquid-liquid interface, it is possible to continue to detect the air-liquid or liquid-liquid interface without interruption even as the tank approaches its empty state, which is frequently when accurate and uninterrupted measurement of layer height is most desired.

As described above, systems and methods for determining liquid height within a tank in which optimization of sweep delay and aliasing are automatically carried out permit more efficient use of processing electronics, reduced sensitivity to temperature and dielectric constant, and improved resolution in detecting the heights of the various layers in which the TDR probe is immersed. Where such systems and methods moreover automatically match electronics and cable-probe-tank systems, this will seamlessly permit the same electronics unit (or multiple instances of the same electronics unit, where this is more practical to implement) to be used with multiple cable-probe-tank systems. Embodiments of such a system in which improved height profile detection resolution made possible by optimization of sweep delay and aliasing is combined with intelligent functionality that leverages known parameters to determine unknown parameters and selectively applies appropriate algorithms for determining layer height make it possible to carry out time domain reflectometric measurement of layer height within a tank in a way that is insensitive to the dielectric constant and/or temperature of at least one layer and that is capable of resolving the heights of the various layers in which a TDR probe is immersed even when stratified layers having comparatively similar dielectric constants are present.

It should be emphasized that the above-described embodiments of the present invention are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A layer height measuring system comprising:
   a transmission line including
      a probe for measuring a height of a first layer within a tank and
      a cable that connects the probe to an electronics unit;
   the electronics unit cyclically transmitting interrogation pulses to the probe and receiving reflections therefrom for time domain reflectometric measurement of the height of the first layer;
   a memory; and
   a processor configured by the memory to perform the steps of:
      detecting first and second impedance transitions corresponding to first and second boundaries of a bounded region of known length;
      optimizing a sweep offset and a sweep gain so as to cause swept sample collection to occur substantially only within the bounded region; and
      detecting a third impedance transition within the bounded region, the third impedance transition corresponding to an interface between the first layer and a second layer, the first and second layers having respectively different dielectric constants,
      wherein at least one of said first and second impedance transitions comprises a fluid-fluid interface.

2. A layer height measuring system according to claim 1, wherein the height of at least one of the layers is determined by converting a time domain height to a space domain height carried out by an impedance-based compensation for dielectric constant.

3. A layer height measuring system according to claim 1, wherein the height of the first layer is measured directly using a spatial profile thereof.

4. A layer height measuring system according to claim 1, wherein the height of the first layer is measured directly using a time of flight therethrough.

5. A layer height measuring system according to claim 1 wherein the height of the first layer is measured indirectly by process of elimination from the known length of the bounded region less the measured height of the second layer.

6. A layer height measuring system according to claim 5 wherein the height of the second layer is measured directly using a spatial profile thereof.

7. A layer height measuring system according to claim 5 wherein the height of the second layer is measured directly using a time of flight therethrough.

8. A layer height measuring system according to claim 1 wherein the height of the first layer is measured indirectly by process of elimination so that the measurement of the height of the first layer is insensitive to the dielectric constant of the first layer.

9. A layer height measuring system according to claim 1 wherein
   the bounded region of known length is a liquid layer;
   the first and second boundaries of the bounded region are respectively the top and the bottom of the liquid layer; and the interface between layers having respectively different dielectric constants is a liquid-liquid interface.

10. A layer height measuring system according to claim 1 wherein the first and second boundaries of the bounded region are respectively locked onto and tracked in closed-loop fashion.

11. A method for measuring the height of a layer with a layer height measuring system comprising a transmission line including a probe for measuring a height of a first layer within a tank, comprising the steps of:
   detecting first and second impedance transitions corresponding to first and second boundaries of a bounded region of known length;
   optimizing a sweep offset and a sweep gain so as to cause swept sample collection to occur substantially only within the bounded region; and
   detecting a third impedance transition within the bounded region, the third impedance transition corresponding to an interface between the first layer and a second layer, the first and second layers having respectively different dielectric constants,
   wherein the detection of the third impedance transition is carried out using a spatial profile method when a signal-to-noise ratio thereof is good, but is carried out using a time-of-flight method when the signal-to-noise ratio of the spatial profile method would be poor.

12. The method of claim 11 wherein the detection of the third impedance transition is carried out using the spatial profile method when the third impedance transition is more than approximately 0.6 inch from the probe bottom, but is carried out using the time of flight method when the third impedance transition is within approximately 0.6 inch of the probe bottom.

13. The method of claim 11 wherein the detection of the third impedance transition is carried out using the spatial profile method when the third impedance transition is more than approximately 0.3 inch from the probe bottom, but is carried out using the time of flight method when the third impedance transition is within approximately 0.3 inch of the probe bottom.

14. A layer height measuring system comprising:
   a transmission line including
      a probe for measuring a height of a first layer within a tank and
      a cable that connects the probe to an electronics unit;
   the electronics unit cyclically transmitting interrogation pulses to the probe and receiving reflections therefrom for time domain reflectometric measurement of the height of the first layer;
   a memory; and
   a processor configured by the memory to perform the steps of:
      detecting first and second impedance transitions corresponding to first and second boundaries of a bounded region of known length;
      optimizing a sweep offset and a sweep gain so as to cause swept sample collection to occur substantially only within the bounded region;

detecting a third impedance transition within the bounded region, the third impedance transition corresponding to an interface between the first layer and a second layer, the first and second layers having respectively different dielectric constants, determining the dielectric constant of at least one of the layers;

determining the temperature of at least one of the layers; and determining the mass of at least one of the layers, wherein a volume of the tank is known.

15. A method for measuring a layer with a layer height measuring electronics unit comprising a transmitter capable of cyclically transmitting interrogation pulses for propagation along a transmission line, and an aliasing sampling receiver for receiving reflections from the transmission line, wherein aliased sample collection is carried out by causing a synchronized delay between times that the interrogation pulses are transmitted and times that the received reflections are sampled to be swept through a series of values over a plurality of the interrogation pulse cycles, the method comprising the steps of:

detecting first and second impedance transitions corresponding to first and second boundaries of a bounded region of known length;

optimizing a sweep offset and a sweep gain so as to cause swept sample collection to occur substantially only within the bounded region; and detecting a third impedance transition within the bounded region, the third impedance transition corresponding to an interface between the first layer and a second layer, wherein at least one of said first and second impedance transitions comprises a fluid-fluid interface.

16. A method of accurately measuring fluid level in a tank through use of an apparatus including a transmission line and an electronics unit, wherein the transmission line includes a probe, and the electronics unit includes a transmitter capable of cyclically transmitting an interrogation pulse for propagation along the transmission line, and an aliasing sampling receiver for receiving reflections from the transmission line, wherein aliased sample collection is carried out by causing a synchronized delay between times that the interrogation pulses are transmitted and times that the received reflections are sampled to be swept through a series of values over a plurality of the interrogation pulse cycles;

the method comprising:

scanning the transmission line to detect first and second impedance transitions;

locking onto and tracking the first and second impedance transitions;

optimizing a sweep offset and a sweep gain so as to cause swept sample collection to occur substantially only between the first and second impedance transitions; and detecting a third impedance transition between the first and second impedance transitions, wherein at least one of said first and second impedance transitions comprises a fluid-fluid interface.

17. A non-transitory computer-readable medium having stored thereon computer-executable instructions for configuring a processor to perform the steps of:

cyclically transmitting an interrogation pulse and receiving reflections therefrom for time domain reflectometric measurement of a height of a first layer;

detecting first and second impedance transitions corresponding to first and second boundaries of a bounded region of known length;

optimizing a sweep offset and a sweep gain so as to cause swept sample collection to occur substantially only within the bounded region; and detecting a third impedance transition within the bounded region, the third impedance transition corresponding to an interface between the first layer and a second layer, wherein at least one of said first and second impedance transitions comprises a fluid-fluid interface.

18. A method for measuring layer height in a tank with a transmission line including a probe for measuring a height of a first layer within a tank and a cable that connects the probe to an electronics unit, the electronics unit cyclically transmitting interrogation pulses to the probe and receiving reflections therefrom for time domain reflectometric measurement of the height of the first layer, a memory, and a processor configured by the memory to perform the steps of:

detecting first and second impedance transitions corresponding to first and second boundaries of a bounded region of known length;

optimizing a sweep offset and a sweep gain so as to cause swept sample collection to occur substantially only within the bounded region;

detecting a third impedance transition within the bounded region, the third impedance transition corresponding to an interface between the first layer and a second layer, the first and second layers having respectively different dielectric constants, determining the dielectric constant of at least one of the layers;

determining the temperature of at least one of the layers; and determining the mass of at least one of the layers, wherein a volume of the tank is known.

* * * * *